US012451584B2

(12) United States Patent
Lee et al.

(10) Patent No.: US 12,451,584 B2
(45) Date of Patent: Oct. 21, 2025

(54) CONNECTION STRUCTURE USING ELASTIC MEMBER AND ELECTRONIC DEVICE INCLUDING THE SAME

(71) Applicant: SAMSUNG ELECTRONICS CO., LTD., Suwon-si (KR)

(72) Inventors: Sangyoon Lee, Suwon-si (KR); Junsig Kum, Suwon-si (KR); Sanghoon Park, Suwon-si (KR); Seungtae Ko, Suwon-si (KR); Jungyub Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 186 days.

(21) Appl. No.: 18/218,369

(22) Filed: Jul. 5, 2023

(65) Prior Publication Data

US 2024/0120636 A1 Apr. 11, 2024

Related U.S. Application Data

(63) Continuation of application No. PCT/KR2023/008879, filed on Jun. 26, 2023.

(30) Foreign Application Priority Data

Oct. 7, 2022 (KR) ........................ 10-2022-0129130

(51) Int. Cl.

| | |
|---|---|
| ***H01Q 1/24*** | (2006.01) |
| ***H01Q 1/08*** | (2006.01) |
| ***H01Q 1/48*** | (2006.01) |
| ***H01Q 3/02*** | (2006.01) |

(52) U.S. Cl.

CPC ............. *H01Q 1/085* (2013.01); *H01Q 1/246* (2013.01); *H01Q 3/02* (2013.01)

(58) Field of Classification Search

CPC . H01P 1/20; H01Q 1/08; H01Q 1/085; H01Q 1/24; H01Q 1/246; H01Q 1/38; H01Q 1/48; H01Q 1/52; H01Q 21/06; H01Q 21/065; H01Q 21/08; H01Q 21/24; H01Q 3/02; H01Q 23/00

See application file for complete search history.

(56) References Cited

U.S. PATENT DOCUMENTS

| | | | | |
|---|---|---|---|---|
| 6,897,373 | B2 | 5/2005 | Barabash | |
| 8,933,857 | B2 * | 1/2015 | Ryu | H01Q 1/48 343/702 |
| 9,123,994 | B2 * | 9/2015 | Lee | H01Q 1/36 |
| 10,374,311 | B2 * | 8/2019 | Faraone | H01Q 5/371 |
| 10,476,151 | B2 * | 11/2019 | Seo | H01Q 1/48 |
| 10,483,635 | B2 | 11/2019 | Yu et al. | |
| 11,283,156 | B2 * | 3/2022 | Jeon | H01Q 1/38 |

(Continued)

FOREIGN PATENT DOCUMENTS

| | | |
|---|---|---|
| CN | 113540759 A | 10/2021 |
| CN | 215008558 U | 12/2021 |

(Continued)

*Primary Examiner* — Tho G Phan

(74) *Attorney, Agent, or Firm* — Sughrue Mion, PLLC

(57) ABSTRACT

An electronic device includes an antenna board configured for massive MIMO. The antenna board is coupled to a filter board using signal contacts with elasticity and ground contacts with elasticity. The configuration of the signal contacts and the ground contacts permits a satisfactory accumulated tolerance in terms of component precision.

20 Claims, 23 Drawing Sheets

(56) References Cited

U.S. PATENT DOCUMENTS

| | | | |
|---|---|---|---|
| 11,612,087 B2 | 3/2023 | Kim et al. | |
| 11,682,870 B2 | 6/2023 | Song et al. | |
| 12,107,328 B2 * | 10/2024 | Ravichandran | H01Q 1/521 |
| 12,107,352 B2 * | 10/2024 | Ramirez-Serrano | H01Q 1/48 |
| 2020/0352060 A1 | 11/2020 | Kim et al. | |
| 2021/0376489 A1 | 12/2021 | Hiramatsu | |

FOREIGN PATENT DOCUMENTS

| | | | |
|---|---|---|---|
| EP | 3 979 403 | A1 | 4/2022 |
| JP | 2001-102747 | A | 4/2001 |
| KR | 10-0700580 | B1 | 3/2007 |
| KR | 10-1015620 | B1 | 2/2011 |
| KR | 10-1311724 | B1 | 9/2013 |
| KR | 10-2013690 | B1 | 8/2019 |
| KR | 10-2159506 | B1 | 9/2020 |
| KR | 10-2020-0127782 | A | 11/2020 |
| WO | 2022/012023 | A1 | 1/2022 |

* cited by examiner

CONNECTION STRUCTURE USING ELASTIC MEMBER AND ELECTRONIC DEVICE INCLUDING THE SAME

CROSS-REFERENCE TO RELATED APPLICATION(S)

This application is a continuation application of international application No. PCT/KR2023/008879, filed on Jun. 26, 2023, which is based on and claims the benefit of Korean patent application number 10-2022-0129130 filed on Oct. 7, 2022 in the Korean Intellectual Property Office, the disclosures of each of which are all hereby incorporated by reference herein in their entireties.

TECHNICAL FIELD

The disclosure relates to a connection structure using an elastic member, and an electronic device including the same.

BACKGROUND ART

Many electronic products with multiple antennas are being developed to improve communication performance, and use of equipment with a much larger number of antennas is expected to be made by utilizing with massive MIMO (multiple input multiple output) technology. As the number of antenna elements in a communication apparatus increases, the number of RF components (such as, e.g., a transceiver, a filter, a power amplifier, etc.) inevitably increases.

The above information is presented as related arts only to assist with an understanding of the present disclosure. No determination has been made, and no assertion is made, as to whether any of the above might be applicable as prior art with regard to the disclosure.

DISCLOSURE

Technical Solution

Provided herein is an electronic device including: a first radio frequency (RF) component; a second RF component; a ground structure having a first elasticity; and a signal structure having a second elasticity, wherein the signal structure electrically connects the first RF component and the second RF component, wherein the ground structure includes a plurality of protrusion portions and a connection portion including an opening, wherein the signal structure includes a substrate portion to be disposed on one surface and a plurality of contact portions for electric connection, and wherein the substrate portion and the plurality of contact portions are disposed in a space formed based on the opening of the connection portion.

Also provided is an electronic device including: a first radio frequency (RF) component; a second RF component; a plurality of connection assemblies disposed between the first RF component and the second RF component, wherein, each connection assembly of the plurality of connection assemblies includes: a ground structure having a first elasticity, and a signal structure having a second elasticity, wherein the signal structure electrically connects the first RF component and the second RF component, wherein the ground structure includes a plurality of protrusion portions and a connection portion including an opening, wherein the signal structure includes a substrate portion to be disposed on one surface and a plurality of contact portions for electric connection, and wherein the substrate portion and the plurality of contact portions are disposed in a space formed based on the opening of the connection portion.

According to embodiments, an electronic device comprises a first radio frequency (RF) component, a second RF component, a ground structure having first elasticity, and a signal structure having second elasticity. The signal structure electrically connects the first RF component and the second RF component. The ground structure comprises a plurality of protrusion portions and a connection portion including an opening. The signal structure comprises a substrate portion to be disposed on one surface and a plurality of contact portions for electric connection. The substrate portion or the plurality of contact portions of the signal structure are disposed in a space formed based on the opening of the connection portion.

According to embodiments, an electronic device comprises, a first radio frequency (RF) component, a second RF component, a plurality of connection assemblies disposed between the first RF component and the second RF component, for a plurality of antennas. The plurality of connection assemblies, for each connection assembly, comprises a ground structure having first elasticity and a signal structure having second elasticity. The signal structure electrically connects the first RF component and the second RF component. The ground structure comprises a plurality of protrusion portions and a connection portion including an opening. The signal structure comprises a substrate portion to be disposed on one surface and a plurality of contact portions for electric connection. The substrate portion or the plurality of contact portions of the signal structure are disposed in a space formed based on the opening of the connection portion.

DETAILED DESCRIPTION

Figure 1:
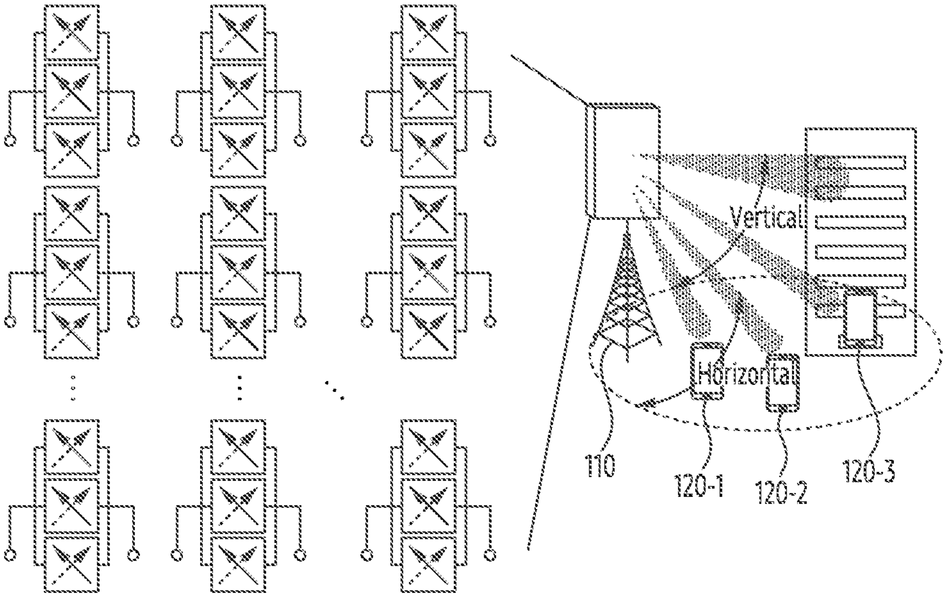
FIG. 1 illustrates an example of a wireless communication environment according to embodiments.

The terms used in the disclosure are merely used to better describe a certain embodiment and may not be intended to limit the scope of other embodiments. A singular expression may include a plural expression, unless the context clearly dictates otherwise. The terms used herein, including technical and scientific terms, may have the same meanings as those commonly understood by those skilled in the art to which the disclosure pertains. Terms defined in a general dictionary amongst the terms used in the disclosure may be interpreted as having the same or similar meaning as those in the context of the related art, and they are not to be construed in an ideal or overly formal sense, unless explicitly defined in the disclosure. In some cases, even the terms defined in the disclosure may not be interpreted to exclude embodiments of the disclosure.

In various examples of the disclosure described below, a hardware approach will be described as an example. However, since various embodiments of the disclosure may include a technology that utilizes both the hardware-based and the software-based approaches, they are not intended to exclude the software-based approach.

As used herein, the term referring to components of an electronic device (e.g., a board, a printed circuit board (PCB), a flexible PCB (FPCB), a module, an antenna, an antenna element, a circuit, a processor, a chip, a component, a device), the term referring to a shape of a component (e.g., a body, a structure, a support portion, a contact portion, a protrusion portion), the term referring to a connection portion between structures (e.g., a connection portion, a contact portion, a support portion, a contact structure, a conductive member, an assembly), or the term referring to a circuit (e.g., a PCB, an FPCB, a signal line, a feeding line, a transmission line, a transmission track, a data line, an RF signal line, an antenna line, an RF path, an RF module, an RF circuit, a splitter, a divider, a coupler, a combiner, etc.) are exemplified for convenience of description. Therefore, the disclosure is not limited to those terms described below, and other terms having the same or equivalent technical meaning may be used therefor. Further, as used herein, the terms such as '. . . module', '. . . unit', '. . . portion', '. . . part', or the like may refer to at least one shape of structure or a unit for processing a certain function.

Further, throughout the disclosure, an expression such as e.g., 'exceeding' or 'less than' may be used to determine whether a specific condition is satisfied or fulfilled, but it is merely of a description for expressing an example and is not intended to exclude the meaning of 'more than or equal to' or 'less than or equal to'. A condition described as 'more than or equal to' may be replaced with 'above', a condition described as 'less than or equal to' may be replaced with 'below', and a condition described as 'more than or equal to and below' may be replaced with 'above and less than or equal to', respectively. Furthermore, hereinafter, 'A' to 'B' may refer to at least one of the elements from A (including A) to B (including B). Hereinafter, 'C' and/or 'D' may refer to including at least one of 'C' or 'D', that is, {'C', 'D', or 'C' and 'D'}.

FIG. 1 illustrates an example of a wireless communication environment according to embodiments. The wireless communication environment of FIG. 1 illustrates a base station 110 and a terminal 120 as some of nodes using a wireless channel. Hereinafter, throughout the disclosure, a common description of a terminal 120-1, a terminal 120-2, and a terminal 120-3 is generally performed with reference to the terminal 120 for convenience of description.

Referring to FIG. 1, the base station 110 is a network infrastructure that provides radio access to the terminal 120. The base station 110 has a coverage based on a distance capable of transmitting a signal. In addition to the term 'base station', the base station 110 may be referred to as 'access point (AP)', 'eNodeB (eNB)', '5G node (5th generation node)', '5G nodeB (5G NB)', 'wireless point', 'transmission/reception point (TRP)', 'access unit', 'distributed unit (DU)', 'radio unit (RU)', 'remote radio head (RRH)', or any other term having an equivalent technical meaning thereto. The base station 110 may transmit a downlink signal or receive an uplink signal.

The terminal 120, which is a device used by a user, performs communications with the base station 110 through a wireless channel. In some cases, the terminal 120 may be operated without user intervention. That is, the terminal 120 is a device that performs machine type communication (MTC) and may not be carried by a user. In addition to the term 'terminal', the terminal 120 may be referred to as 'user equipment (UE)', 'mobile station', 'subscriber station', 'customer premises equipment (CPE)', 'remote terminal', 'wireless terminal', 'electronic device', 'vehicle terminal', 'user device', or any other term having an equivalent technical meaning thereto.

As one of the techniques for mitigating the propagation path loss and increasing the transmission distance of radio waves, a beamforming technique is in use. Such a beamforming generally serves to concentrate the reach area of radio waves using multiple antennas or increase the directivity of receive sensitivity in a specific direction. Accordingly, the base station 110 may have a plurality of antennas so as to form a beamforming coverage, instead of forming a signal in an isotropic pattern with a single antenna. According to an embodiment of the disclosure, the base station 110 may include a massive MIMO unit (MMU). An arrangement in which a plurality of antennas are assembled may be referred to as an antenna array, and each antenna included in the array may be referred to as an array element or an antenna element. The antenna array may be configured in various forms such as a linear array, a planar array or the like. The antenna array may be referred to as a massive antenna array.

One of major technologies for improving the data capacity of 5G communication is the beamforming technology with an antenna array connected to multiple RF paths. For higher data capacity, the number of RF paths will have to increase or the power per RF path will have to increase. Increasing the RF paths will lead to increase in size of the product, and due to spatial constraints in installing an actual base station equipment, such an increase will be no longer feasible. In order to increase the antenna gain with a higher output while without increasing the number of RF paths, a plurality of antenna elements may be connected to the RF path using a divider (or splitter) to increase the antenna gain. Here, the antenna elements corresponding to the RF path may be referred to as a sub-array.

In order to improve communication performance, the number of antennas (or antenna elements) in the equipment (e.g., the base station 110) for performing wireless communication is increasing. Further, the number of RF components (e.g., amplifiers, filters, other components) for processing RF signals received or transmitted through the antenna elements also increase, so that it is essentially required to obtain better spatial gain and cost efficiency while meeting the requirements of communication performance in configuring the communication equipment.

In FIG. 1, the base station 110 of FIG. 1 is illustrated as an example to describe a connection assembly for a structure for a signal line and a structure for a ground line according to the disclosure and an electronic device including the same, but the embodiments of the disclosure are not limited thereto. It will be obvious that as a matching network and the electronic device including the same according to the embodiments of the disclosure, in addition to the base station 110, a wireless equipment performing substantially the same function as the base station, a wireless equipment (e.g., TRP) connected to the base station, the terminal 120 of FIG. 1, or any other communication equipment used for 5G communication are all possible.

Hereinafter, in the disclosure, an antenna array having sub-arrays as the structure of a plurality of antennas for communication in a MIMO (Multiple Input Multiple Output) environment will be described as an example, but it will be obvious that in some embodiments, easy modification for beamforming would be possible.

Figure 2A:
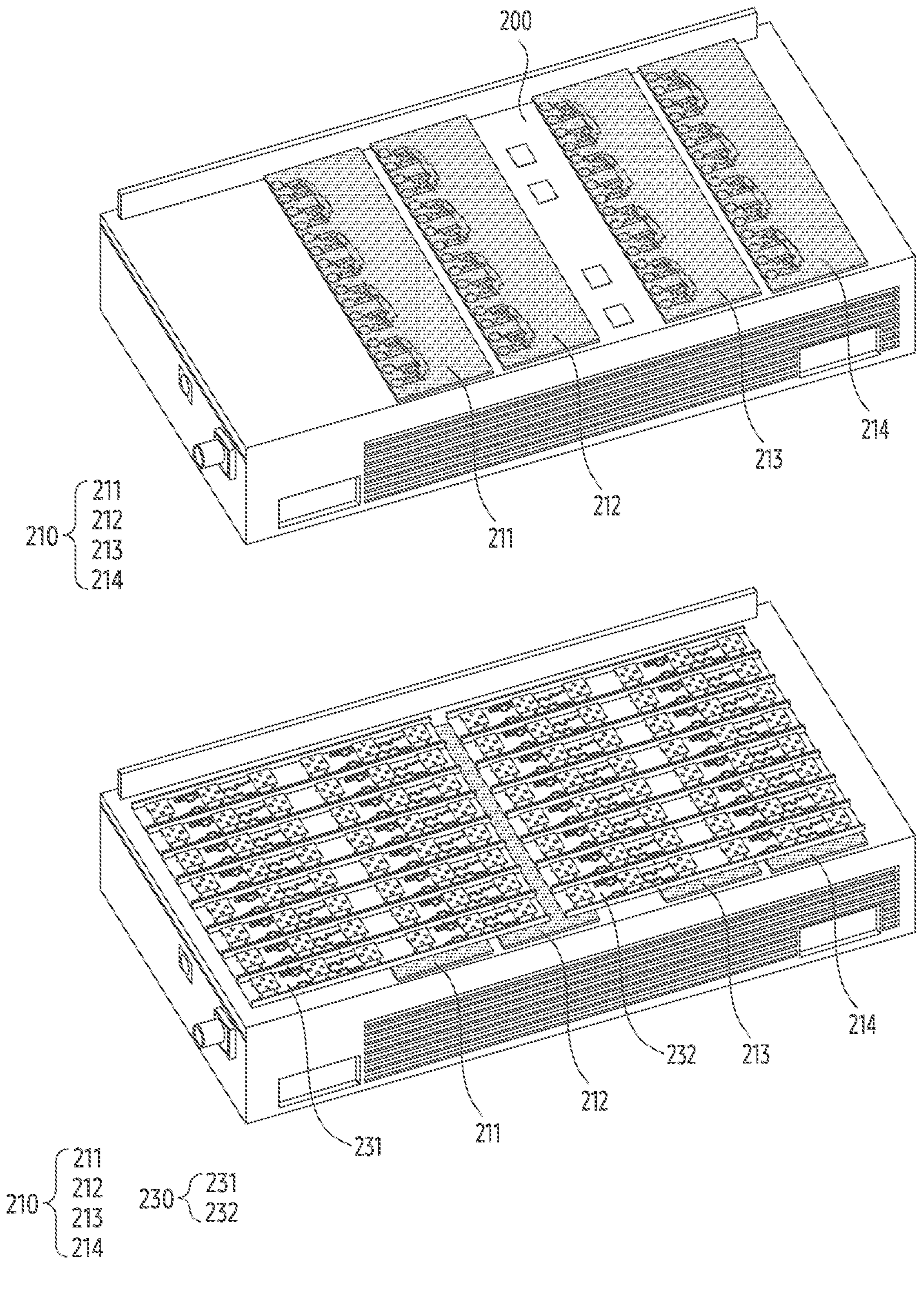
FIG. 2A illustrates an example of a stacked structure of an electronic device according to an embodiment.

FIG. 2A illustrates an example of a stacked structure of an electronic device according to an embodiment.

Referring to FIG. 2A, an equipment 210 refers to a radiation device of the base station 110. The equipment 210 may include a main board 200. A filter PCB 210 may be disposed on one surface of the main board 200. For example, a plurality of filter PCBs (e.g., a first filter PCB 211, a second filter PCB 212, a third filter PCB 213, and a fourth filter PCB 214) may be disposed on one surface of the main board 200. An antenna 230 may be disposed on the filter PCB 210. The equipment 210 may include multiple antennas. According to an embodiment, the equipment 210 may include an array antenna including a plurality of antenna elements. According to an embodiment, the equipment 210 may include an array antenna having a plurality of sub-arrays. Each sub-array may include a plurality of antenna elements. The first sub-arrays may be disposed on a first antenna substrate 231. The second sub-arrays may be disposed on a second antenna substrate 232.

Figure 2B:
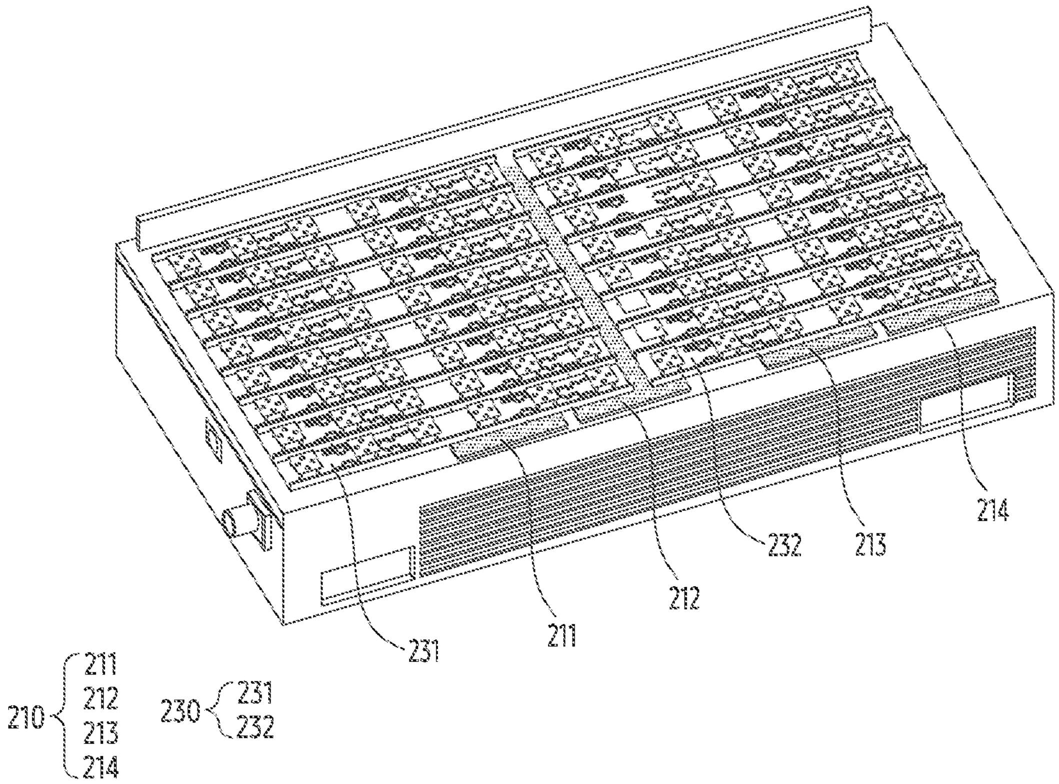
FIG. 2B illustrates an example of a connection structure of radio frequency (RF) components of an electronic device according to an embodiment.
Figure 2B:
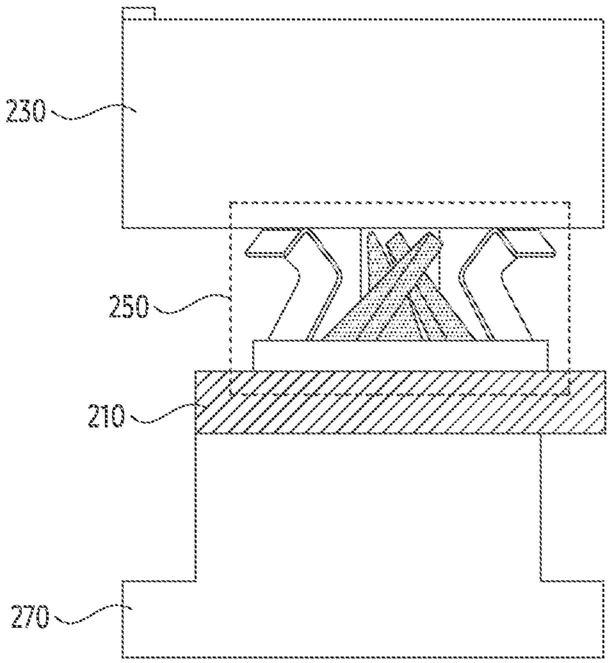

FIG. 2B illustrates an example of a connection structure of radio frequency (RF) components of an electronic device according to an embodiment. Further, FIG. 2B illustrates a cross-section of the equipment 210 of FIG. 2A.

Referring to FIG. 2B, one surface of the filter PCB 210 may be coupled to one surface of the antenna substrate 230 through the connection structure 250. A filter 270 may be disposed on an opposite surface of the one surface of the filter PCB 210. The connection structure 250 according to an embodiment may include a signal line and a ground line to feed a signal to an antenna element. Although only one connection structure 250 is illustrated in FIG. 2B, multiple connection structures may be disposed between the antenna substrate 230 and the filter PCB 210, for multiple antennas.

In order to ensure a more stable connection, the number of required contact points between the two RF components may increase.

Tolerance refers to a tolerable limit of a standard range. The standard range may be determined according to the tolerable limit range determined on the basis of the nominal size, that is, the tolerance. Accumulated tolerance or tolerance accumulation may refer to an acceptable limit of an assembly according to an allowable limit of a single component being accumulated when multiple components are assembled together. Machining tolerance may refer to a tolerance determined according to machining of components. As a communication apparatus is implemented in the form in which a plurality of RF components are assembled, the tolerance may increase occurring every time those RF components are assembled, which may cause performance degradation. Further, even if the same function is performed, a cost for meeting the required communication performance may also add to an overhead, owing to its structural difference and the difference in its electrical characteristics.

In order to address the above-described problems, the disclosure proposes a connection structure using an elastic member for stable connection between RF components. In addition, when performing surface mounted technology (SMT), formation of an elastic member that is easy to move is required for efficient assembly between RF components (e.g., the filter PCB 210 or the antenna substrate 230).

Figure 3:
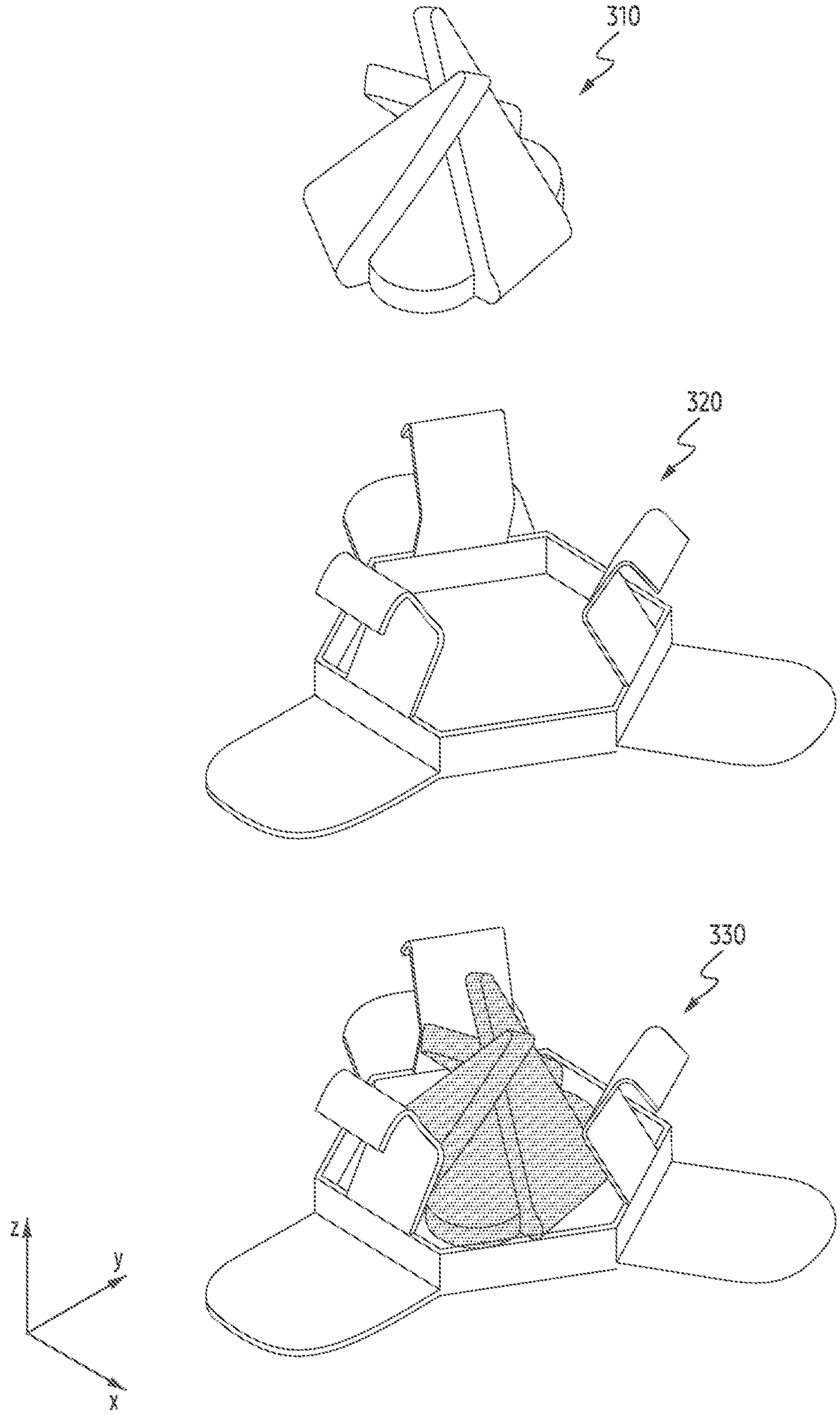
FIG. 3 illustrates an example of a connection assembly according to an embodiment.

FIG. 3 illustrates an example of a connection assembly according to an embodiment.

Referring to FIG. 3, a connection assembly 330 may include a signal structure 310 and a ground structure 320. The connection assembly 330 may include the signal structure 310. The signal structure 310 may function as a signal line in an RF path. Through the signal structure 310, an RF-processed signal may be fed to the antenna. The structural description of the signal structure 310 will be described in more detail with reference to FIG. 4A. The connection assembly 330 may include the ground structure 320. The ground structure 320 may function as a ground line in the RF path. Noise may be removed through the ground structure 320, and stable connection of RF signals fed through the signal structure 310 may be provided. The structural description of the ground structure 320 will be described in more detail with reference to FIG. 4B.

Figure 4A:
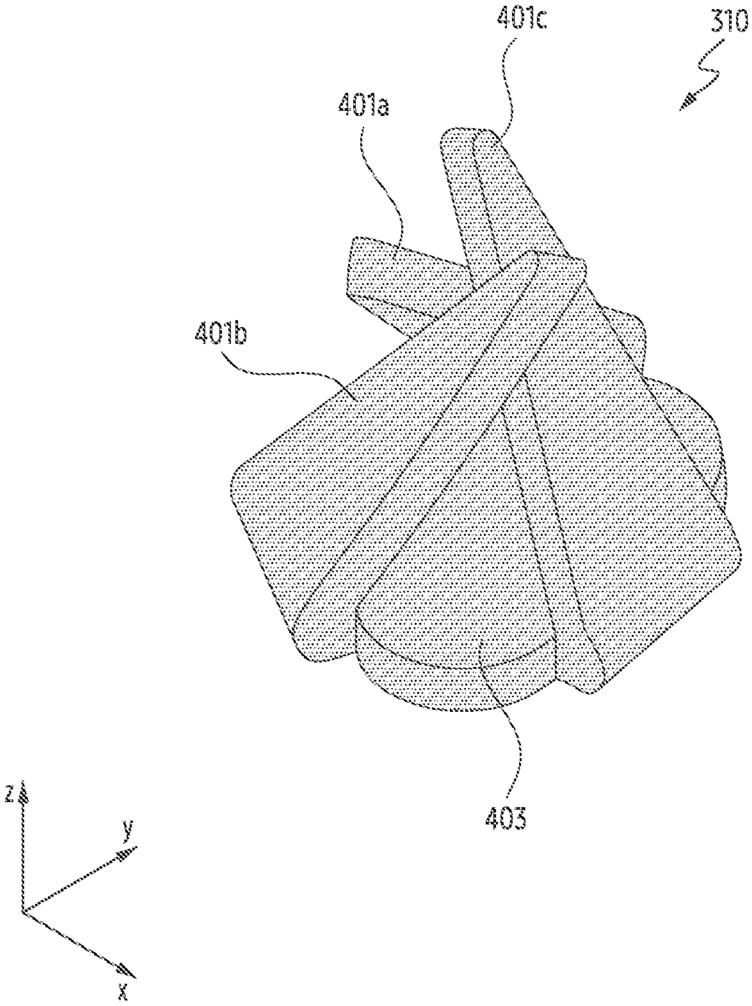
FIG. 4A illustrates an example of a signal structure according to an embodiment.

FIG. 4A illustrates an example of a signal structure according to an embodiment. The signal structure 310 may include an elastic conductor. In some embodiments, the elastic conductor has a spring-like behavior. "Elastic" means the spring will return to its original form once a force pressing on the spring is removed, for example, during a process of assembly or dis-assembly. The compression of the spring in distance and a magnitude an applied force causing the compression are related by Hooke's law. The degree of elasticity may be reflected by Hooke's constant. The value of Hooke's constant for the signal structure 310 may depend on the number of antenna elements, the sizes of the first substrate 610 and second substrate 620, see FIG. 6, and a reliability goal in terms of tolerance accumulation.

Referring to FIG. 4A, the signal structure 310 may include a plurality of contact portions 401 and a substrate portion 403. According to an embodiment, the signal structure 310 may have elasticity. For example, the elasticity of the signal structure 310 may correspond to a first value of Hooke's constant. The signal structure 310 may include a conductor to transmit an RF signal.

The signal structure 310 may include a plurality of contact portions 401. The plurality of contact portions 401 may include a first contact portion 401*a*, a second contact portion 401*b*, and a third contact portion 401*c*. The plurality of contact portions 401 may be connected at a regular interval along a boundary of a substrate portion 403. One end of the contact portion 401 may be coupled to the substrate portion 403. The other end of the contact portion 401 may be disposed above one surface with respect to one surface of the substrate portion 403. That is, each contact portion 401 may include a connection area and a contact area. The connection area refers to an area in which the contact portion 401 is coupled to the substrate portion 403, and the contact area refers to an area in which the contact portion 401 comes into contact with one surface of a PCB (e.g., a filter PCB or an antenna substrate) to form an electrical connection. The area may include a plurality of points. For example, the first contact portion 401*a* may have a first contact through contact with the PCB. The second contact portion 401*b* may have a second contact through contact with the PCB. The third contact portion 401*c* may have a third contact through contact with the PCB. The signal structure 310 may provide at least three electrical contacts. According to an embodiment, the contact portion 401 may have a triangular shape. A bottom side of the triangle may correspond to the connection area. The vertex of the triangle may correspond to the contact point.

The shape of the signal structure 310 may be changed by a pressure in a specific direction. The contact portion 401 may have a flexible height based on a pressure applied in a direction perpendicular to the surface of the substrate portion 403. Since the contact portion 401 has elasticity, a partial area of the contact portion 401 may come close to the substrate portion 403 with respect to the direction of the pressure, in response to a pressure of a predetermined magnitude or more.

According to an embodiment, the substrate portion 403 may include a supporting surface. The surface may be coupled to a substrate or a PCB (e.g., a filter PCB or an antenna substrate). One end portion of each of the contact portions may be disposed above a surface opposite to the supporting surface of the substrate portion 403. For example, a partial area of the first contact portion 401*a*, a partial area of the second contact portion 401*b*, and a partial area of the third contact portion 401*c* may be disposed above the surface opposite to the surface of the substrate portion 403. Instead of having a spring-like shape, the signal structure 310 may be configured to provide electrical connection between two components (e.g., an antenna substrate and a filter PCB) through contact portions integrally formed with the substrate portion 403.

The signal structure 310 shown in FIG. 4A is only for an example. The shape shown in FIG. 4A should not be interpreted as limiting any other shapes including the same technical principle. According to another embodiment, the substrate portion 403 may be connected to two or four contact portions or more. According to another embodiment, the shape of the contact portion may include a hemispherical or clipped structure instead of a triangle.

Figure 4B:
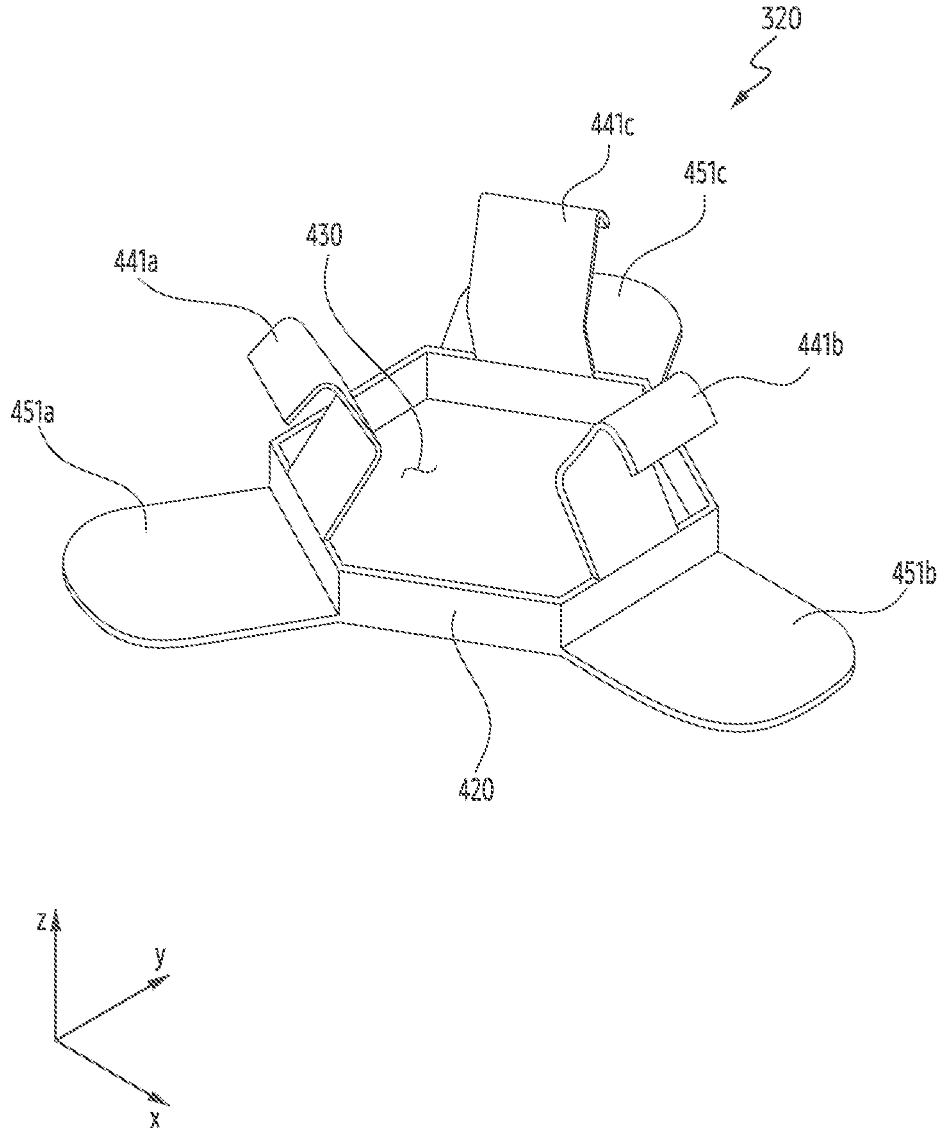
FIG. 4B illustrates an example of a ground structure according to an embodiment.

FIG. 4B illustrates an example of a ground structure according to an embodiment. The ground structure 320 may include an elastic conductor.

Referring to FIG. 4B, the ground structure 320 may include a connection portion 420, a plurality of protrusion portions 441, and a plurality of support portions 451. An opening of the connection portion 420 of the ground structure 320 may form a spatial area 430. The connection portion 420 may have a columnar shape including an empty spatial area 430. The boundary line of the connection portion 420 may be in the form of a ring, and the connection portion 420 may be disposed to enclose a certain area to form an opening. The connection portion 420 may be disposed around a certain area to form the opening.

A plurality of protrusion portions 441 of the ground structure 320 may be connected to the connection portion 420. Each of the plurality of protrusion portions 441 may be connected to the connection portion 420 along the boundary line of the connection portion 420. The plurality of protrusion portions 441 may include a first protrusion portion 441*a*, a second protrusion portion 441*b*, and a third protrusion portion 441*c*. Each protrusion portion 441 may have elasticity. For example, the elasticity of the protrusion portion 441 may correspond to a second value of Hooke's constant. Each protrusion portion 441 may have a bending form based on the boundary line of the connection portion 420.

A plurality of support portions 451 of the ground structure 320 may be connected to the connection portion 420. Each of the plurality of support portions 451 may be connected to the support portion 420 along the boundary line of the connection portion 420. The plurality of support portions 441 may include a first support portion 451*a*, a second support portion 451*b*, and a third support portion 451*c*. Each support portion 451 may be disposed on one surface of a PCB (e.g., an antenna substrate or a filter PCB). According to an embodiment, the plurality of support portions 451 of the ground structure 320 may be used for picking-up for a surface mounted technology (SMT) process on one surface of the PCB.

The ground structure 320 may include a connection portion 420 forming an empty space in which the signal structure 310 may be disposed, that is, the spatial area 430, instead of a structure for fixing a signal pin. The ground structure 320 may provide an electrical connection between two components (e.g., an antenna substrate and a filter PCB) through the connection portion 420, without a separate fixing member.

The ground structure 320 shown in FIG. 4B is only for an example. The shape shown in FIG. 4B should not be interpreted as limiting other shapes including the same technical principle. According to another embodiment, the connection portion 420 may be connected to two or four support portions or more. According to another embodiment, the shape of the protrusion portion may include a hemispherical or clipped structure instead of a bending plate shape.

Hereinafter, referring to FIGS. 5A to 5C, a structure having a shape different from that of FIGS. 4A to 4B will be described.

Figure 5A:
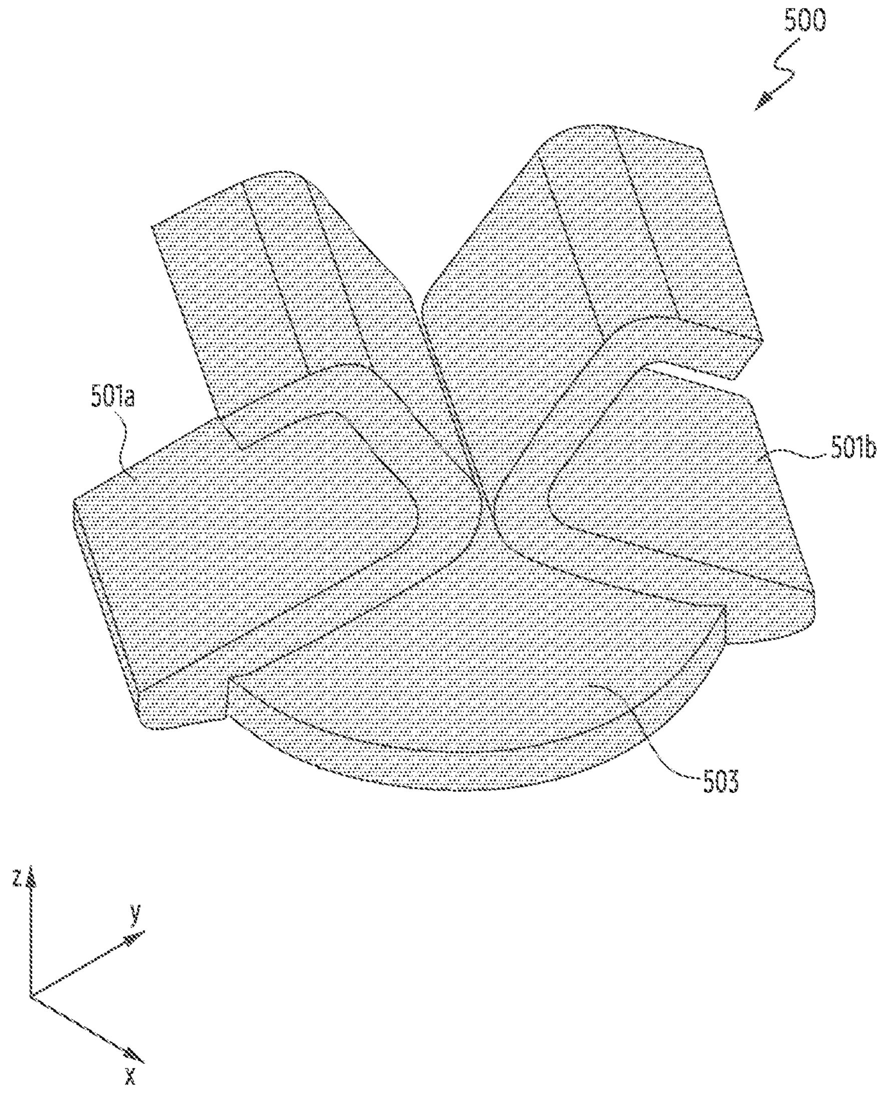
FIG. 5A illustrates another example of a signal structure according to an embodiment.

FIG. 5A illustrates another example of a signal structure according to an embodiment. The signal structure 310 may include an elastic conductor.

Referring to FIG. 5A, a signal structure 500 may include a plurality of contact portions 501 and a substrate portion 503. According to an embodiment, the signal structure 500 may have elasticity. For example, the elasticity of the signal structure 500 may correspond to a third value of Hooke's constant. The signal structure 500 may be a conductor to transmit an RF signal.

The signal structure 500 may include a plurality of contact portions 501. The plurality of contact portions 501 may include a first contact portion 501*a* and a second contact portion 501*b*. The plurality of contact portions 501 may be connected at regular intervals along a boundary of the substrate portion 503. Unlike the signal structure 310, the signal structure 500 has two contact portions, and thus, the first contact portion 501*a* and the second contact portion 501*b* may be disposed symmetrically with respect to the substrate portion 503.

One end of the contact portion 501 may be coupled to the substrate portion 503. The other end of the contact portion 501 may be disposed above one surface with respect to the one surface of the substrate portion 503. In other words, each contact portion 501 may include a connection area and a contact area. The connection area refers to an area in which the contact portion 501 is coupled to the substrate portion 503, and the contact area refers to an area in which the contact portion 501 is in contact with one surface of a PCB (e.g., a filter PCB or an antenna substrate) to form an electrical connection. The area may include a plurality of points. For example, the first contact portion 501*a* may have a first contact point (or a first tangent line) through contact with the PCB. The second contact portion 501*b* may have a second contact point (or a second tangent line) through contact with the PCB. The signal structure 310 may provide at least two electrical contact points. According to an embodiment, the contact portion 501 may have a curved C-shaped column.

The shape of the signal structure 500 may change by a pressure in a specific direction. The contact portion 501 may have a flexible height based on a pressure applied in a direction perpendicular to the surface of the substrate portion 503. Since the contact portion 501 has elasticity, a partial area of the contact portion 501 may move away from the substrate portion 503 with respect to the direction of the pressure, in response to a pressure of a certain magnitude or more. When a pressure is applied in the direction perpendicular to the surface of the substrate portion 503, each of the first contact portion 501*a* and the second contact portion 501*b* may be spread out in a direction away from the center of the substrate portion 503.

According to an embodiment, the substrate portion 503 may include a supporting surface. The surface may be coupled to a substrate or a PCB (e.g., a filter PCB or an antenna substrate). A partial area of the first contact portion 501*a* or a partial area of the second contact portion 501*c* may be disposed above a surface opposite to the surface of the substrate portion 503. A partial area of the first contact portion 501*a* or a partial area of the second contact portion 501*c* may be in contact with each other above the surface opposite to the surface of the substrate portion 503.

Figure 5B:
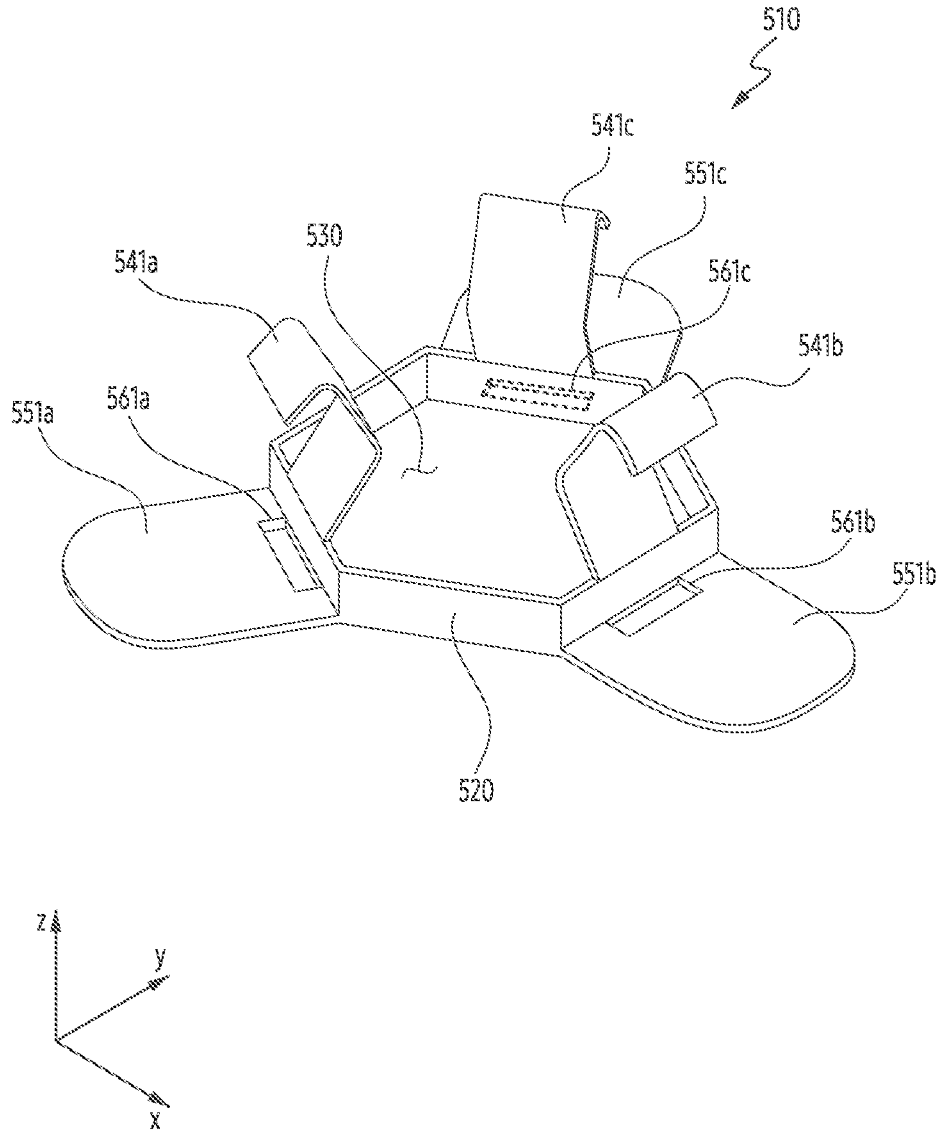
FIG. 5B illustrates another example of a ground structure according to an embodiment.

FIG. 5B illustrates another example of a ground structure according to an embodiment.

Referring to FIG. 5B, the ground structure 510 may include a connection portion 520, a plurality of protrusion portions 541, and a plurality of support portions 551. The connection portion 520 of the ground structure 510 may form an opening 530. The connection portion 520 may be in the form of a column having the opening 530. A boundary line of the connection portion 520 is in the form of a loop, and the connection portion 520 may be disposed to enclose a certain area to form the opening 530. The connection portion 520 may be disposed around the certain area to form the opening 530.

The plurality of protrusion portions 541 of the ground structure 510 may be connected to the connection portion 520. Each of the plurality of protrusion portions 541 may be connected to the connection portion 520 along the boundary line of the connection portion 520. The plurality of protrusion portions 541 may include a first protrusion portion 541*a*, a second protrusion portion 541*b*, and a third protrusion portion 541*c*. Each protrusion portion 541 may have elasticity. For example, the elasticity of the protrusion portion 541 may correspond to a fourth value of Hooke's constant. Each protrusion portion 541 may have a bending form with respect to the boundary line of the connection portion 520.

The structural components described in this application with elasticity may have the same or different elasticities.

The plurality of support portions 551 of the ground structure 510 may be connected to the connection portion 520. Each of the plurality of support portions 551 may be connected to the support portion 520 along the boundary line of the connection portion 520. The plurality of support portions 541 may include a first support portion 551*a*, a second support portion 551*b*, and a third support portion 551*c*. Each support portion 551 may be disposed on one surface of a PCB (e.g., an antenna substrate or a filter PCB). According to an embodiment, the plurality of support portions 551 of the ground structure 510 may be used for picking-up for the SMT process on one surface of the PCB.

As opposed to the ground structure 320, the ground structure 510 may include at least one slit. The slit may be formed in an area in which the connection portion 520 and each support portion are connected. For example, a first slot 561*a* may be formed in between the connection portion 520 and the first support portion 551*a*. A second slot 561*b* may be formed in between the connection portion 520 and the second support portion 551*b*. A third slot 561*c* may be formed in between the connection portion 520 and the third support portion 551*c*.

Figure 5C:
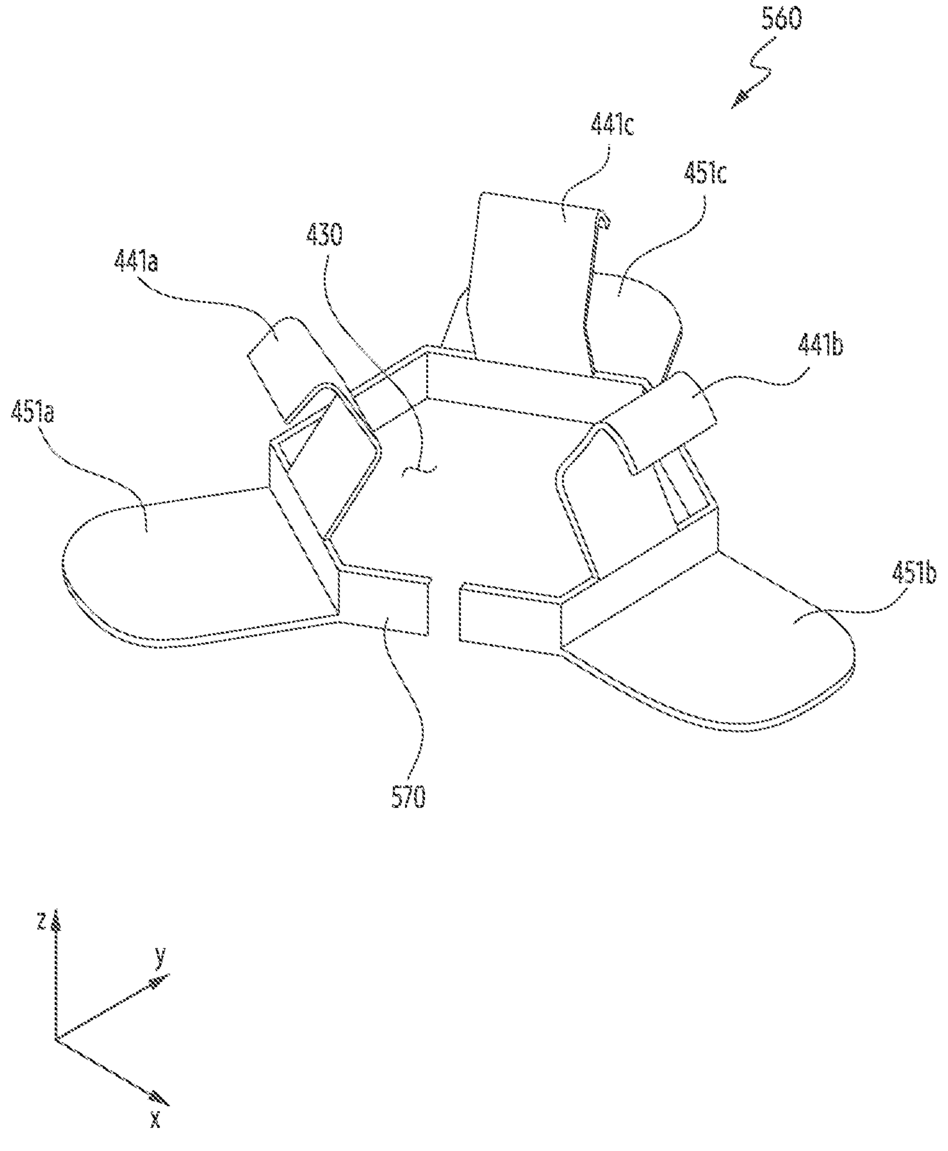
FIG. 5C illustrates another example of a ground structure according to an embodiment.

FIG. 5C illustrates another example of a ground structure according to an embodiment.

Referring to FIG. 5C, a ground structure 560 may include a connection portion 570, a plurality of protrusion portions 441, and a plurality of support portions 451. Description is made of the plurality of protrusion portions 441 and the plurality of support portions 451, referring to FIG. 4B. In FIG. 4B or 5B, the connection portion of the ground structure has a closed loop shape, but a portion of the boundary line of the connection portion 570 of FIG. 5C may be open.

Hereinafter, for a connection structure for assembling of RF components, the connection assembly 330 of FIG. 3 is illustrated, but the embodiments of the disclosure are not limited thereto. In addition to the connection assembly 330 of FIG. 3, the embodiments of the disclosure may include a connection assembly in which the signal structure 310 of FIG. 4A or the signal structure 500 of FIG. 5A is coupled to any one of the ground structure 320 of FIG. 4B, the ground structure 510 of FIG. 5B, or the ground structure 560 of FIG. 5C.

Figure 6A:
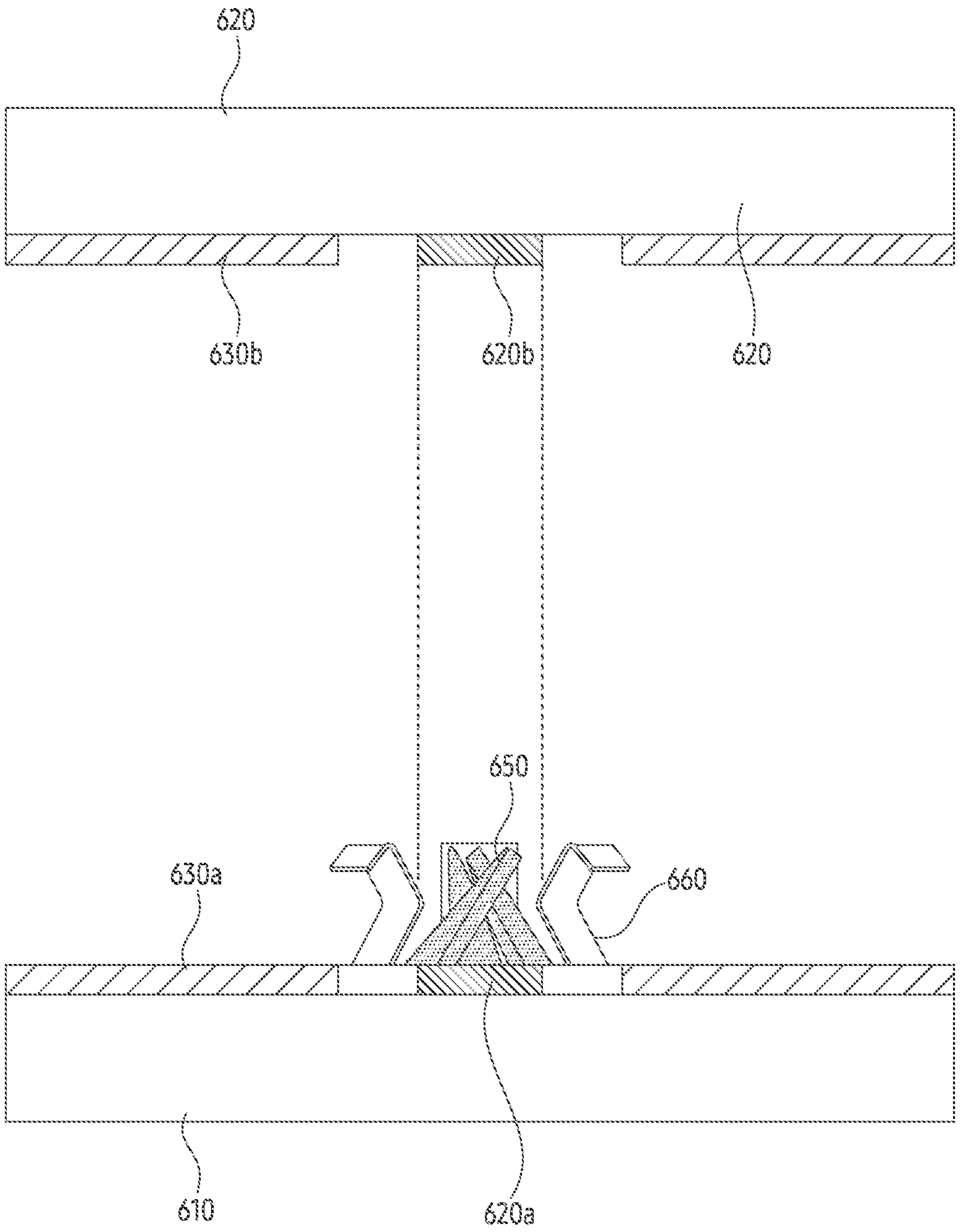
FIGS. 6A and 6B each illustrate an example of a connection structure using a connection assembly according to an embodiment.
Figure 6B:
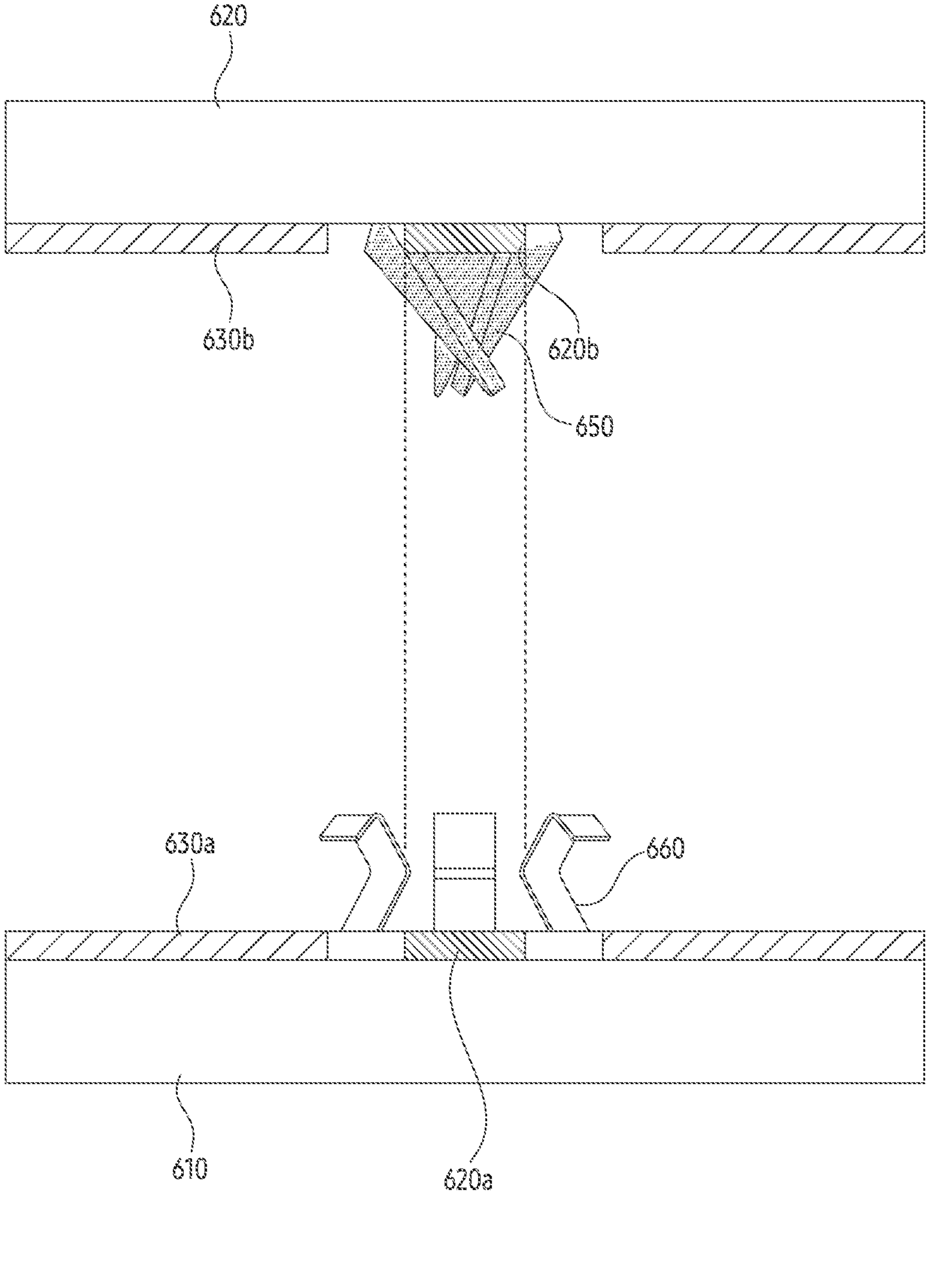

FIGS. 6A to 6B illustrate an example of a connection structure using a connection assembly according to an embodiment. The connection assembly may be configured by a combination of the signal structure and the ground structure of FIGS. 2A to 5C.

Referring to FIG. 6A, the connection assembly may be disposed between a first substrate 610 and a second substrate 620. The surface of the first substrate 610 and the surface of the second substrate 620 which face each other may be referred to as interior surfaces. The surface of the first substrate 610 and the second substrate 620 which face away from each other may be referred to as exterior surfaces. The first substrate 610 may include an antenna board (an antenna PCB or an antenna substrate). The second substrate 620 may include a filter board (or a filter PCB or a calibration network PCB). A ground substrate 630*a* may be disposed on one surface of the first substrate 610. The one surface of the first substrate 610 may face the one surface of the second substrate 620. The connection assembly may be disposed on one surface of the first substrate 610. The connection assembly may include a signal structure 650 and a ground structure 660. The ground structure 660 may be connected to the ground substrate 630*a*. The signal structure 650 may be connected to a feeding portion 620*a*. According to an embodiment, the substrate portion of the signal structure 650 may be in contact with the feeding portion 620*a*. The substrate portion of the signal structure 650 may be electrically connected to the feeding portion 620*a*. According to an embodiment, the signal structure 650 may be mounted on one surface of the first substrate 610 according to the SMT process. A substrate portion of the signal structure 650 may be mounted on one surface of the first substrate 610. According to an embodiment, the ground structure 660 may be mounted on one surface of the first substrate 610 according to the SMT process. Each support portion of the ground structure 660 may be mounted on one surface of the first substrate 610.

A ground substrate 630*b* may be disposed on one surface of the second substrate 620. The one surface of the second substrate 620 may face one surface of the first substrate 610. At least a portion of the signal structure 650 of the connection assembly may be in contact with a feeding portion 620*b* of the second substrate 620 on one surface of the second substrate 620. Each contact area of a plurality of contact areas of the signal structure 650 of the connection assembly may form a contact point with the second substrate 620. Through the contact point, an RF signal from the feeding portion 620*a* may be provided to the feeding portion 620*b*. As an electrical connection is provided through the contact point, the signal structure 650 may function as a signal line. As each protrusion portion of the ground structure 660 is disposed at a position surrounding the signal line, the ground structure 660 may function as a ground line.

Referring to FIG. 6A, in some embodiments, the substrate portion of the signal structure is in contact with a first interior surface of the first RF component, the plurality of contact portions of the signal structure are configured to contact a feeding portion of the second RF component, an antenna is disposed on a first exterior surface of the first RF component opposite to the first interior surface of the first RF component, and a second interior surface of the second RF component is disposed to face the first interior surface of the first RF component.

Also referring to FIG. 6A, in some embodiments, the plurality of protrusion portions of the ground structure are configured to contact a ground substrate of the second RF component, and a plurality of support portions of the ground structure are disposed on the first interior surface of the first RF component.

Referring to FIG. 6A, description has been made of an example in which both the signal structure 650 and the ground structure 660 are mounted on one surface of the substrate 610, but the embodiments of the disclosure are not limited thereto. According to another embodiment, for the efficiency of the manufacturing process, the signal structure 650 may be mounted on a substrate different from the ground structure 660. Hereinafter, an example in which the signal structure 660 is disposed on one surface of the second substrate 620 will be described with reference to FIG. 6B.

Referring to FIG. 6B, the connection assembly may be disposed between the first substrate 610 and the second substrate 620. The first substrate 610 may include an antenna board (an antenna PCB or an antenna substrate). The second substrate 620 may include a filter board (or a filter PCB or a calibration network PCB). A ground 630*a* substrate may be disposed on one surface of the first substrate 610. The one surface of the first substrate 610 may face one surface of the second substrate 620. On one surface of the first substrate 610 may be disposed only the ground structure 660 of the connection assembly. The ground structure 660 may be connected to the ground substrate 630*a*. According to an embodiment, the ground structure 660 may be mounted on one surface of the first substrate 610 according to the SMT process. Each support portion of the ground structure 660 may be mounted on one surface of the first substrate 610.

A ground 630*b* substrate may be disposed on one surface of the second substrate 620. The one surface of the second substrate 620 may face one surface of the first substrate 610. The signal structure 650 may be connected to a feeding portion 620*b* of the second substrate 620. According to an embodiment, the substrate portion of the signal structure 650 may be in contact with the feeding portion 620*b*. The substrate portion of the signal structure 650 may be electrically connected to the feeding portion 620*b*. Each contact area of a plurality of contact areas of the signal structure 650 of the connection assembly may form a contact point with the first substrate 610. Through the contact point, an RF signal from the feeding portion 620*a* may be provided to the feeding portion 620*b*. As an electrical connection is provided through the contact point, the signal structure 650 may function as a signal line. As each protrusion portion of the ground structure 660 is disposed at a position surrounding the signal line, the ground structure 660 may function as a ground line. At least a portion of the signal structure 650 may be in contact with the feeding portion 620*a* of the second substrate 610 on one surface of the first substrate 610.

Referring to FIG. 6B, in some embodiments a plurality of contact portions of the signal structure are configured to contact a feeding portion of the first RF component, the substrate portion of the signal structure is disposed on a second interior surface of the second RF component, an antenna is disposed on a first exterior surface of the first RF component opposite to a first interior surface of the first RF component, and the second interior surface of the second RF component is disposed to face the first interior surface of the first RF component.

Also referring to FIG. 6B, the plurality of protrusion portions of the ground structure are configured to contact a ground substrate of the second RF component, and the plurality of support portions of the ground structure are disposed on the first interior surface of the first RF component.

Referring to FIGS. 6A to 6B, description has been made of an example in which the signal structure is in contact with one surface of the substrate and one surface of another substrate, for electrical connection between the substrates. However, the connection assembly having the shape according to embodiments of the disclosure may be disposed not only between the substrates, but also between electrical connections between the RF components or between the substrates and/or the RF components. For example, for electrical connection between the RF component and the substrate, the signal structure may provide electrical contact to both one surface of the RF component and one surface of the substrate.

In FIGS. 2A to 6B, the support portion is illustrated for mounting the ground structure, but the embodiments of the disclosure are not limited thereto. According to another embodiment, one ground structure may be arranged on the substrate to accommodate a plurality of signal structures instead of an individual ground structure.

Figure 7A:
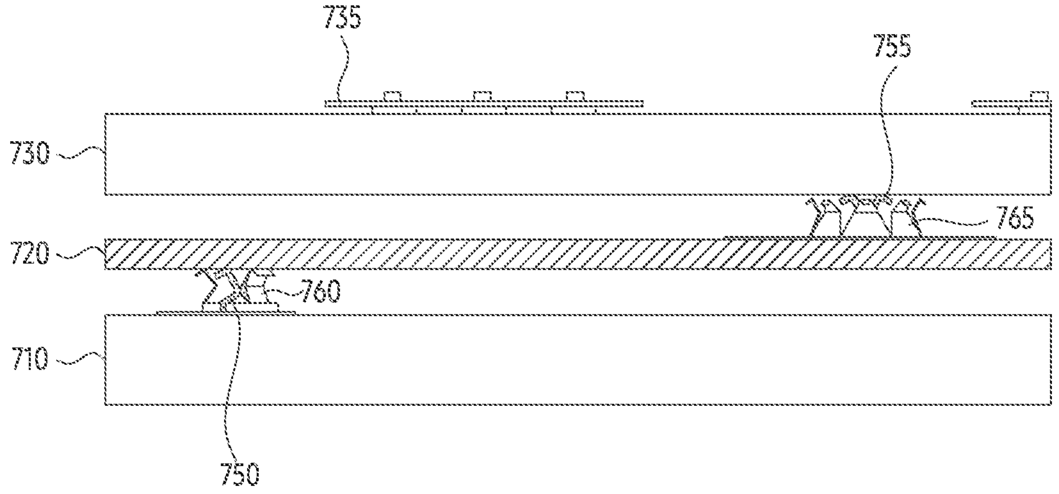
FIG. 7A illustrates an example of a stacked structure of an electronic device using a connection assembly according to an embodiment.

FIG. 7A illustrates an example of a stacked structure of an electronic device using a connection assembly according to an embodiment.

Referring to FIG. 7A, an electronic device 101 may include a stacked structure arranged in the order of a filter 710, a PCB 720, and an antenna substrate 730. The PCB 720 may be an interposer. A connection assembly may be disposed on one surface of the filter 710. A connection assembly may include a signal structure 750 and a ground structure 760. For example, a substrate portion of the signal structure 750 may be disposed on the one surface of the filter 710. For example, a support portion of the ground structure 760 may be disposed on the one surface of the filter 710. Protrusion portions of the ground structure 760 may form a space between the filter 710 and the PCB 720. Contact portions of the signal structure 750 may be arranged within the space formed. A plurality of contact portions of the signal structure 750 may be in contact with one surface of the PCB 720. A signal of the filter 710 may be provided to the PCB 720 through the signal structure 750.

The other surface of the PCB 720 opposite to the one surface may be electrically connected to the antenna substrate 730 through another connection assembly. According to an embodiment, the antenna substrate 730 may include a dielectric material (e.g., plastic). According to another embodiment, the antenna substrate 730 may include a metal material. The connection assembly according to the embodiments of the disclosure does not particularly limit the type of RF component to be connected. However, since the connection assembly according to the embodiments of the disclosure may provide a stable electrical connection without a connector mounted on a separate metal substrate, it can be more effectively used for antenna elements of the antenna substrate 730 connected through injection molding.

The other connection assembly may include a signal structure 755 and a ground structure 765. One surface of the antenna substrate 730 may face one surface of the PCB 720. A ground substrate on which the ground structures 765 are integrally formed may be disposed on one surface of the PCB 720. The ground structure 765 may include a connection portion (i.e., an area forming an opening) and protrusion portions integrally formed along the connection portion. According to an embodiment, a substrate portion of the signal structure 755 may be disposed on one surface of the PCB 720. A contact portion of the signal structure 755 may contact one surface of the antenna substrate 730. According to another embodiment, the arrangement of the signal structure 755 may be changed up and down. The substrate portion of the signal structure 755 may be disposed on one surface of the antenna substrate 730. The contact portion of the signal structure 755 may be in contact with one surface of the PCB 720. An antenna 735 may be disposed on the other surface of the antenna substrate 730.

Figure 7B:
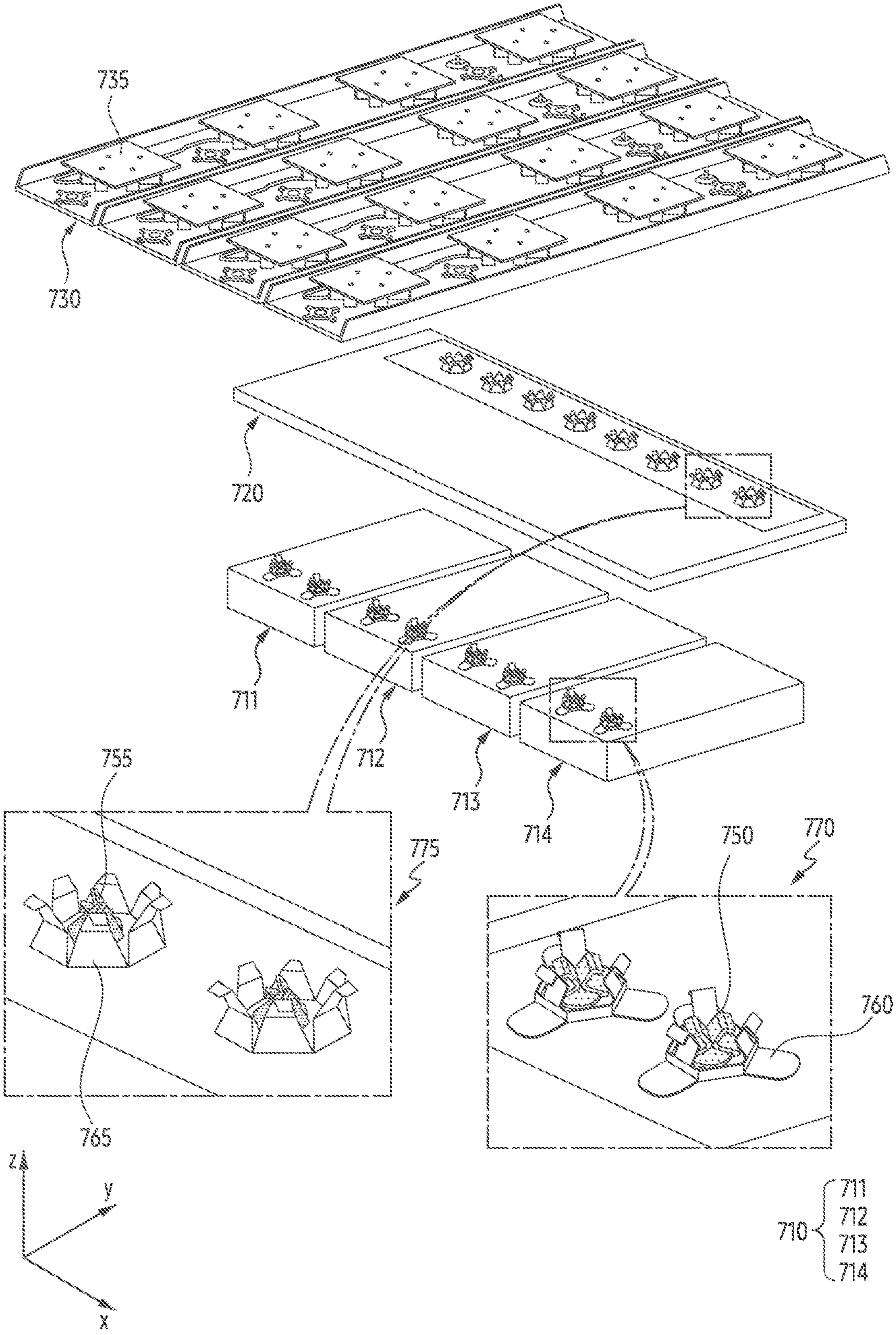
FIG. 7B is an exploded perspective view illustrating a stacked structure of an electronic device using a connection assembly according to an embodiment.

FIG. 7B is an exploded perspective view of a stacked structure of an electronic device using a connection assembly according to an embodiment. For example, FIG. 7B is the exploded perspective view of the electronic device 101 having the stacked structure of FIG. 7A. In the drawings, like reference numerals may indicate like components.

Referring to FIG. 7B, the electronic device 101 may include a stacked structure arranged in the order of a filter 710, a PCB 720, and an antenna substrate 730. The electronic device 101 may include a plurality of filters. In the electronic device 101, each of the plurality of filters 711, 712, 713, and 714 may include one or more connection structures for coupling with the PCB 720. For example, each connecting structure may include a signal structure 750 and a ground structure 760. The ground structure 760 may include a support portion for stable arrangement on one surface of an individual filter. As each of the plurality of filters 711, 712, 713, and 714 is individually assembled, the ground structure 760 may be mounted on one surface of the corresponding filter according to the SMT process.

The PCB 720 may be coupled to the antenna substrate 730 on which a plurality of antenna elements are mounted. A plurality of antenna elements may be arranged on one surface of the antenna substrate 730. Each antenna element may be a patch antenna, and it is to be noted that the embodiments of the disclosure are not limited to the patch shape. Signals having different polarizations (e.g., H polarization/V polarization or +45 degree polarization/−45 degree polarization) may be fed to each antenna element, and the signals may be radiated into the air through the corresponding antenna element. To feed a signal to each antenna element, the PCB 720 may include a plurality of signal structures. However, the ground structure corresponding to each of the plurality of signal structures may not necessarily exist. According to an embodiment, the ground structure for each of the plurality of signal structures may be integrally formed.

Referring to the connection structure 770, both the signal structure 750 and the ground structure 760 corresponding to the signal structure 750 may be disposed on one surface of the filter. The ground structure 760 may be mounted on one surface of the filter through a plurality of support portions. However, the signal fed to the antenna subsequent to the filter may require the same ground. That is, since a common ground for all the antenna elements is required, one ground substrate for each of the plurality of signal structures may be arranged on the PCB 720.

Referring to a connection structure 775, the ground substrate may be disposed on one surface of the PCB 720. The ground structure 765 for receiving the signal structure 755 may be disposed on one surface of the ground substrate. According to an embodiment, the ground substrate may include a plurality of ground structures. The plurality of ground structures may be integrally formed with the ground substrate. The ground substrate may have a plurality of receiving structures. The shape of each receiving structure may correspond to the protrusion portion of the ground structure of FIGS. 3 to 6B. In other words, the receiving structure may correspond to the ground structure without any support portion. The protrusion portions may be arranged along the connection portion (i.e., an area in which an opening is formed). The protrusion portions may be used, outside the signal structure, to remove noise from the signal and provide a stable electrical connection.

As described above, the signal structure 750 according to embodiments of the disclosure may provide an electrical connection only through a plurality of contact points with a conductor, without a PCB or an additional structure for a fixed signal pin. To connect the two RF components, the signal structure 750 may be connected to an RF component (e.g., a PCB) via a substrate portion (e.g., a substrate portion 403 or a substrate portion 503) of the signal structure 750. Further, in order to connect the two RF components, the signal structure 750 may be connected to an RF component (e.g., an antenna feeding line) through a plurality of contact portions (e.g., contact portions 401 and contact portions 501) of the signal structure 750. An antenna (e.g., a subarray or an antenna element) may be arranged in each area of an antenna substrate (e.g., a dielectric substrate) formed through injection molding. A feeding portion of the antenna may be formed as an external conductor underneath the antenna substrate, and the conductor may form a plurality of electrical contact points with the signal structure 750. Therefore, even if it is not disposed on a substrate form such as a PCB, it is possible to provide stable electrical connection, thereby achieving reduced weight of its antenna end.

Figure 8A:
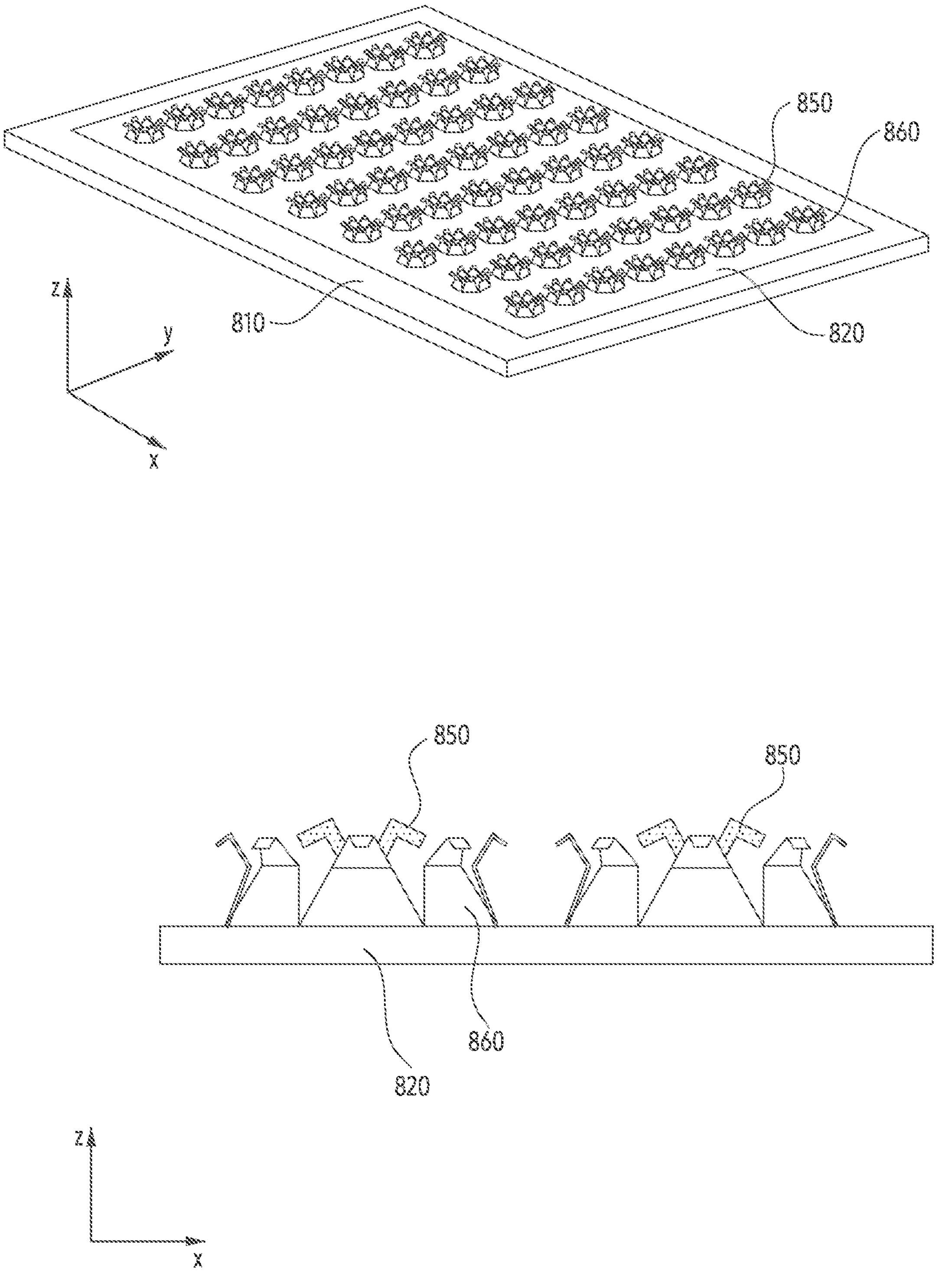
FIG. 8A illustrates an example of a coupling structure between a ground substrate and a plurality of signal structures according to an embodiment.
Figure 8B:
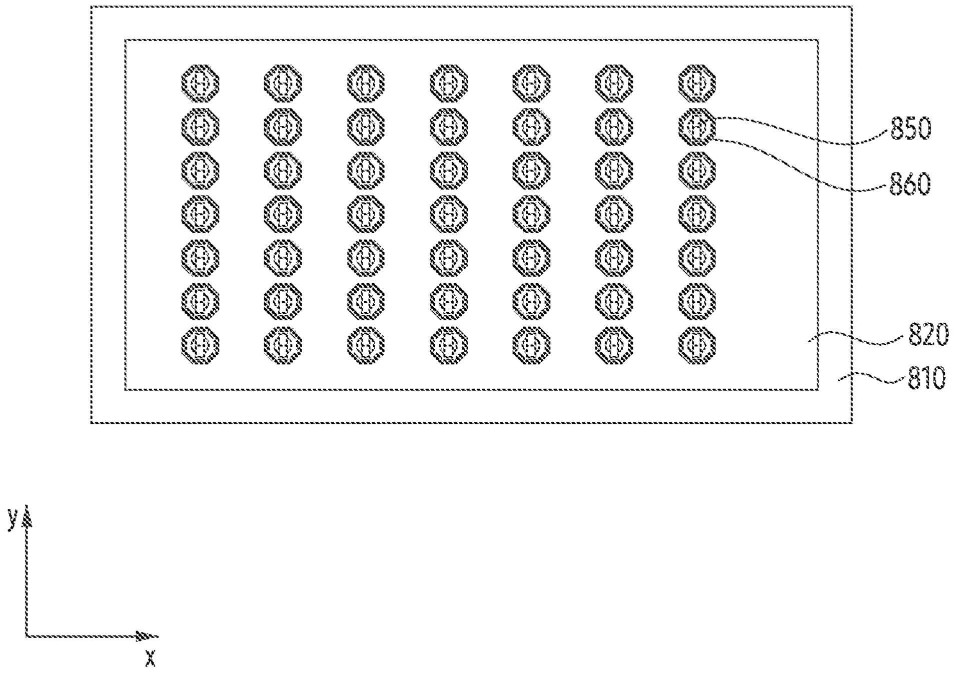
FIG. 8B is a plan view illustrating a coupling structure of a ground substrate and a plurality of signal structures according to an embodiment.

FIG. 8A illustrates an example of a coupling structure between a ground substrate and a plurality of signal structures according to an embodiment FIG. 8B is a plan view illustrating a coupling structure of a ground substrate and a plurality of signal structures according to an embodiment.

Referring to FIG. 8A, a ground substrate 820 may be disposed on a substrate 810. According to an embodiment, the ground substrate 820 may be disposed on one surface of the substrate 810. According to another embodiment, the ground substrate 820 may be formed in the last layer of the plurality of layers of the substrate 801. The ground substrate 820 may have a plurality of receiving structures for receiving a plurality of signal structures. In order to provide common ground performance to a plurality of signal structures, a ground substrate 820 in which a plurality of receiving structures are integrally formed may be used. The ground substrate 820 may include an opening for each receiving structure. The receiving structure of the ground substrate 820 may include a boundary line forming the opening and protrusion portions 860 connected along the boundary line, for receiving the signal structure 850.

The signal structure 850 may function as a signal line. The signal structure 850 may correspond to a port. The signal structure 850 may supply a signal to an antenna (or an antenna element or a sub-array). According to an embodiment, the size of the ground substrate 820 may be determined based on the number of signal structures 850 received by the receiving structures of the ground substrate 820.

Figure 9:
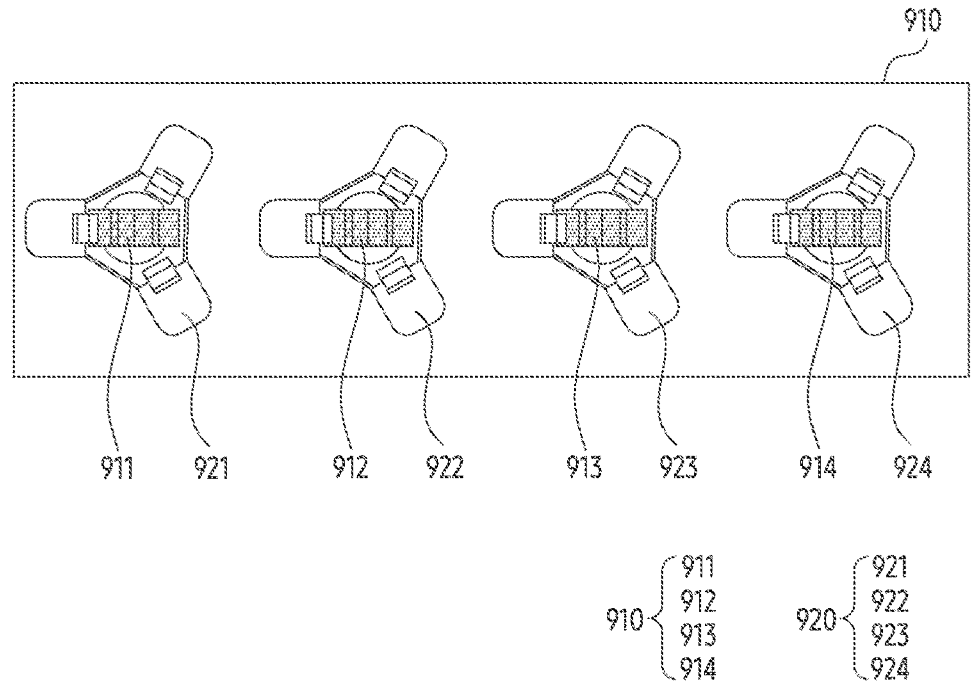
FIG. 9 illustrates an example of a substrate on which connection assemblies are disposed according to an embodiment.
Figure 9:
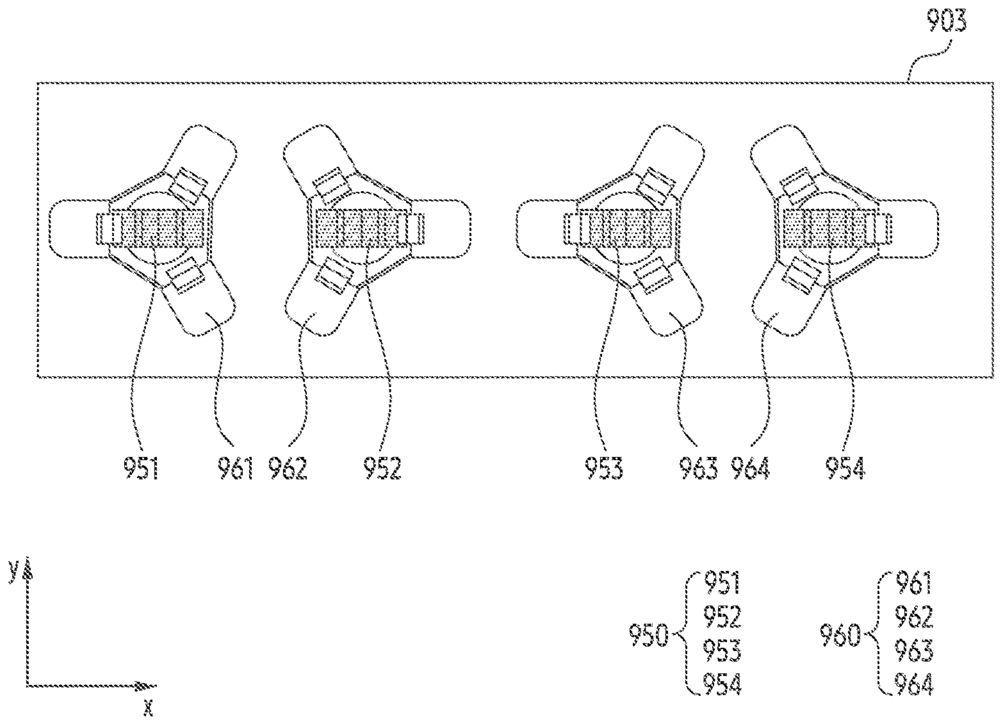

FIG. 9 illustrates an example of a substrate on which connection assemblies are arranged according to an embodiment. The RF signal supplied through the connection assembly may correspond to the port. The RF signal may be fed to an antenna (or an antenna element or a sub-array) through the connection assembly.

Referring to FIG. 9, four connection assemblies may be disposed on one surface of the substrate 901. Each connection assembly may include a signal structure 910 and a ground structure 920. According to an embodiment, for keeping an interval between the ports, the connection assemblies may be arranged to have the same interval between the connection assemblies in the substrate 901. Each connection assembly may include a port for feeding a signal to an antenna. For example, a first connection assembly may include a first signal structure 911 and a first ground structure 921. A second connection assembly may include a second signal structure 912 and a second ground structure 922. A third connection assembly may include a third signal structure 913 and a third ground structure 923. A fourth connection assembly may include a fourth signal structure 914 and a fourth ground structure 923. The first ground structure 921, the second ground structure 922, the third ground structure 923, and the fourth ground structure 924 may be arranged in the same direction at regular intervals.

According to an embodiment, one port may be associated with a specific polarization amongst a plurality of polarizations. The plurality of polarizations may include a first polarization and a second polarization. The second polarization may be substantially perpendicular to the first polarization. For example, the first polarization may be +45 degree polarization, and the second polarization may be −45 degree polarization. As another example, the first polarization may be −45 degree polarization, and the second polarization may be +45 degree polarization. As another example, the first polarization may be horizontal(H)-polarization, and the second polarization may be vertical(V)-polarization. For another example, the first polarization may be V-polarization, and the second polarization may be H-polarization.

Four connecting assemblies may be disposed on one surface of the substrate 903. Each connection assembly may include a signal structure 950 and a ground structure 960. Each connection assembly may include a port for supplying a signal to an antenna. The port may be an object for identifying a transmission path using a signal structure. According to an embodiment, the interval between the connection assemblies may be different. For example, an interval between the connection assemblies for the signal structures configured to supply different polarizations to the same antenna element may be different from the interval between the connection assemblies configured to supply the signal to different antenna elements. For example, a first connection assembly may include a first signal structure 951 and a first ground structure 961. A second connection assembly may include a second signal structure 952 and a second ground structure 962. A third connection assembly may include a third signal structure 953 and a third ground structure 963. A fourth connection assembly may include a fourth signal structure 954 and a fourth ground structure 964.

On the substrate 903, the interval between the first connection assembly and the second connection assembly may be different from that between the second connection assembly and the third connection assembly. According to an embodiment, the interval between the first connection assembly and the second connection assembly may be shorter than that between the second connection assembly and the third connection assembly. The first connection assembly and the second connection assembly may be associated with one antenna element. The polarization of the RF signal supplied by the first signal structure 951 of the first connection assembly may be different from the polarization of the RF signal supplied by the second signal structure 952 of the second connection assembly. The first connection assembly and the third connection assembly may be associated with different antenna elements. In the same manner, the third connection assembly and the fourth connection assembly may be associated with the same antenna element.

In FIG. 9, the positions of the ground structure and the signal structure in the substrate are described on the basis of the antenna element and the polarization, but the embodiments of the disclosure are not limited thereto. In addition to polarization, the position of the port may vary based on whether it is either the same sub-array or the same RF module.

Subarray technology is a key enabler of massive MIMO systems. The subarray technology allows for the large number of antennas required in massive MIMO systems to be grouped into smaller, more manageable subarrays. The subarray technology reduces the complexity and cost of the system, while also improving its performance. In a massive MIMO system, the number of antennas is typically on the order of hundreds or even thousands. This can make the system difficult to design, implement, and maintain. Subarray technology addresses these challenges by dividing the large antenna array into smaller subarrays. Each subarray can then be operated independently, which simplifies the design and implementation of the system.

In the subarray technology, signals may be supplied to a plurality of antenna elements from a communication circuit (e.g., RFIC, communication chip) to increase signal gain. A feedline from the communication circuit may be distributed, and each branch may be electrically connected to a corresponding antenna element of the plurality of antenna elements. According to an embodiment, the signal structure of the present disclosure may correspond to the feedline. According to another embodiment, the signal structure of the present disclosure may correspond to one branch of the feedline.

In the subarray technology, feedlines for various polarizations (e.g., vertical polarization and horizontal polarization, (+)45 degree polarization and (−)45 degree polarization) may be disposed on the substrate. A signal of the first polarization may be provided to each antenna element of the subarray, and a signal of the second polarization may be provided to each antenna element of the subarray. According to an embodiment, the electronic device may include both of a signal structure to which a signal of a first polarization is provided and a signal structure to which a signal of a second polarization is provided.

In order to arrange the connection assembly according to the embodiments of the disclosure described with reference to FIGS. 2A to 9 between two RF components, it is required a procedure of lifting a structure (e.g., a signal structure or a ground structure) and placing the structure onto a substrate (hereinafter, referred to as a pick-up procedure). Further, in order to increase the yield of equipment produced through assembly between the RF components, it is required a structural shape for a pick-up procedure. Hereinafter, description will be made of the shape of the signal structure or the ground structure with reference to FIGS. 10A to 12B.

Figure 10A:
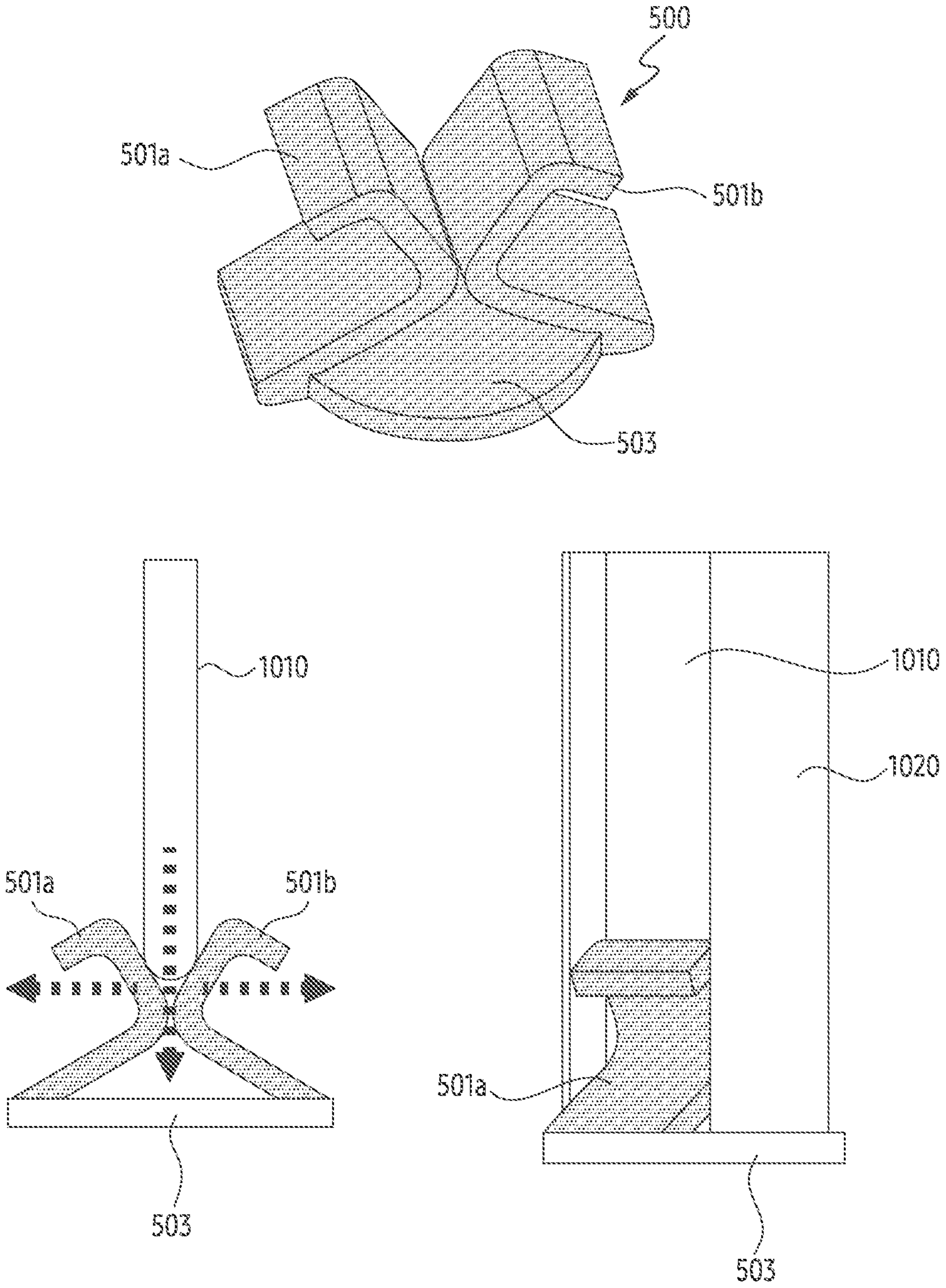
FIGS. 10A and 10B each illustrate an example of picking-up of a signal structure according to an embodiment.
Figure 10B:
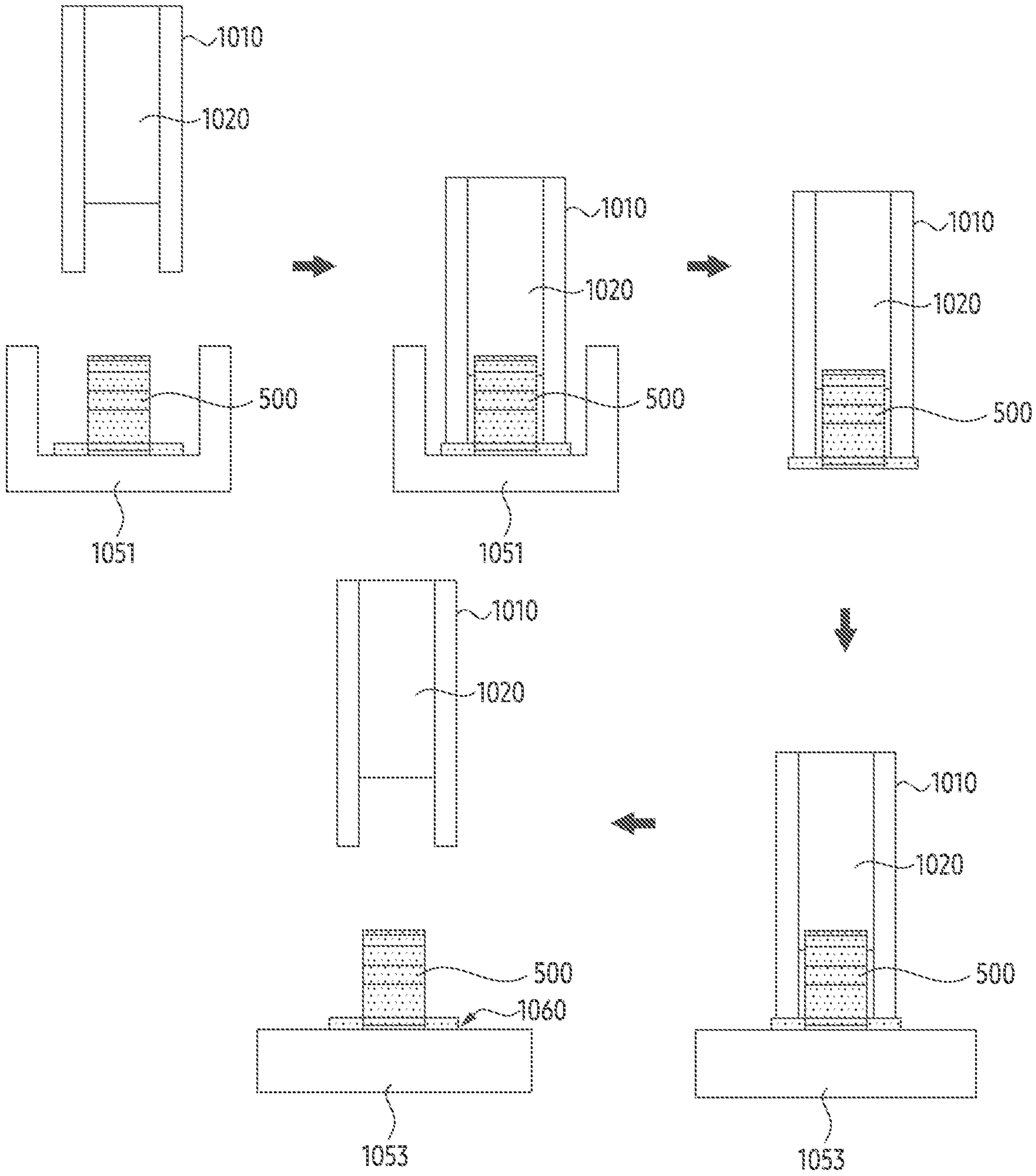

FIGS. 10A and 10B illustrate an example of pick-up of a signal structure according to an embodiment. To describe the shape for the pick-up procedure, the signal structure 500 is described as an example in FIGS. 10A and 10B.

Referring to FIG. 10A, the signal structure 500 may include a plurality of contact portions 501. The plurality of contact portions 501 may include a first contact portion 501*a* and a second contact portion 501*b*. The plurality of contact portions 501 may be connected at regular intervals along the boundary of the substrate portion 503.

According to an embodiment, the signal structure 500 may have a shape in which the first contact portion 501*a* and the second contact portion 501*b* are physically in contact with each other. The first contact portion 501*a* may include an elastic material. The second contact portion 501*b* may include an elastic material. Thereafter, a pick-up support 1010 may be inserted between the first contact portion 501*a* and the second contact portion 501*b* of the signal structure 500. The pick-up support 1010 may be inserted in a direction perpendicular to the surface of the substrate portion 503, that is, in the direction the surface of the substrate portion 503 faces. Due to the insertion of the pick-up support 1010, the first contact portion 501*a* and the second contact portion 501*b* may be spread out from the central axis of the substrate portion 503 outwardly. As the pick-up support 1010 of a pick-up tool reaches a position where it is subjected to the pressure of the first contact portion 501*a* and the pressure of the second contact portion 501*b* by a certain size or more, the elastic structure is spread out. Since the first contact portion 501*a* and the second contact portion 501*b* have elasticity, they may come into contact with the pick-up support 1010 to push the pick-up support 1010 toward the central axis of the substrate portion 503. Due to the elastic structure, the pick-up support 1010 may function as tweezing.

The pick-up tool may include a pick-up support 1010 and a housing 1020 (or a sleeve). The pick-up support 1010 may fix the signal structure 500. The signal structure 500 may be coupled to the pick-up tool through suction in the inner space of the housing 1020. According to an embodiment, the substrate portion 503 may include a surface facing a suction direction to provide a drag against the suction direction during air suction. As the pick-up tool moves, the signal structure 500 may move.

Referring to FIG. 10B, the signal structure 500 may be disposed in a packaging member 1051. For example, the signal structure 500 may be packed through reel packaging. The pick-up tool may be inserted into one area of the packaging member 1051. The signal structure 500 may be connected to the pick-up tool via the pick-up support 1010. Due to the elastic characteristics of the first contact portion 501*a* and the second contact portion 503*b* of the signal structure 500, the pick-up support 1010 may be in contact with each of the first contact portion 501*a* and the second contact portion 503*b*. Although not illustrated in FIG. 10B, according to an additional embodiment, air in the inner space of the housing 1020 of the pick-up tool may be sucked through the pick-up tool. Other areas except for the connection area of the substrate portion 503 of the signal structure 500 may be coupled to the housing 1020 of the pick-up tool. Due to the coupling of the housing 1020 and the substrate portion 503 of the pick-up tool, the inner space of the housing 1020 may be sealed.

Due to movement of the pick-up tool, the signal structure 500 may also move together. The pick-up tool may move over one surface of the substrate 1053 on which the signal structure 500 is to be disposed. As the pick-up tool moves close to the one surface of the substrate 1053, the signal structure 500 may get close to the one surface of the substrate 1053. The pick-up tool may move until the substrate portion 503 of the signal structure 500 come into contact with the one surface of the substrate 1053. When the substrate portion 503 of the signal structure 500 is disposed on the one surface of the substrate 1053, the pick-up tool may be removed. According to an embodiment, the signal structure 500 may be coupled to the substrate 1053 using the SMT (surface mounted technology) process 1060.

In FIGS. 10A to 10B, description has been made of an example in which the signal structure 500 is disposed on the substrate surface, but the embodiments of the disclosure are not limited thereto. The ground structure may be first formed or disposed before the signal structure 500 is coupled. The signal structure 500 may be positioned, via a pick-up tool, in the opening area of the ground structure formed on the substrate or the ground structure disposed on the substrate. For example, the substrate 1053 may include a PCB on which RF components such as an antenna substrate or a filter for antenna elements are arranged.

Figure 11A:
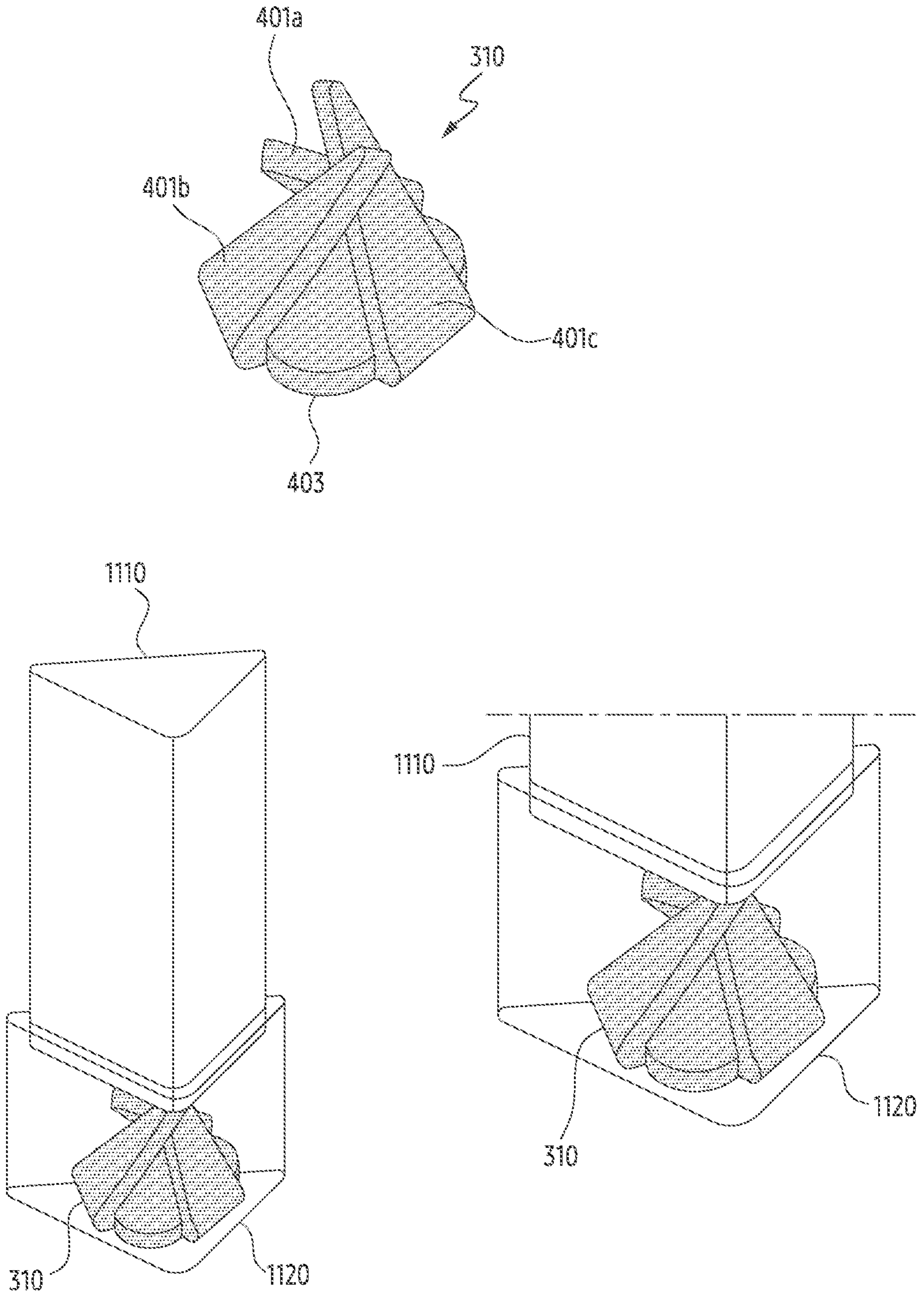
FIGS. 11A and 11B each illustrate an example of picking-up a signal structure according to an embodiment.
Figure 11B:
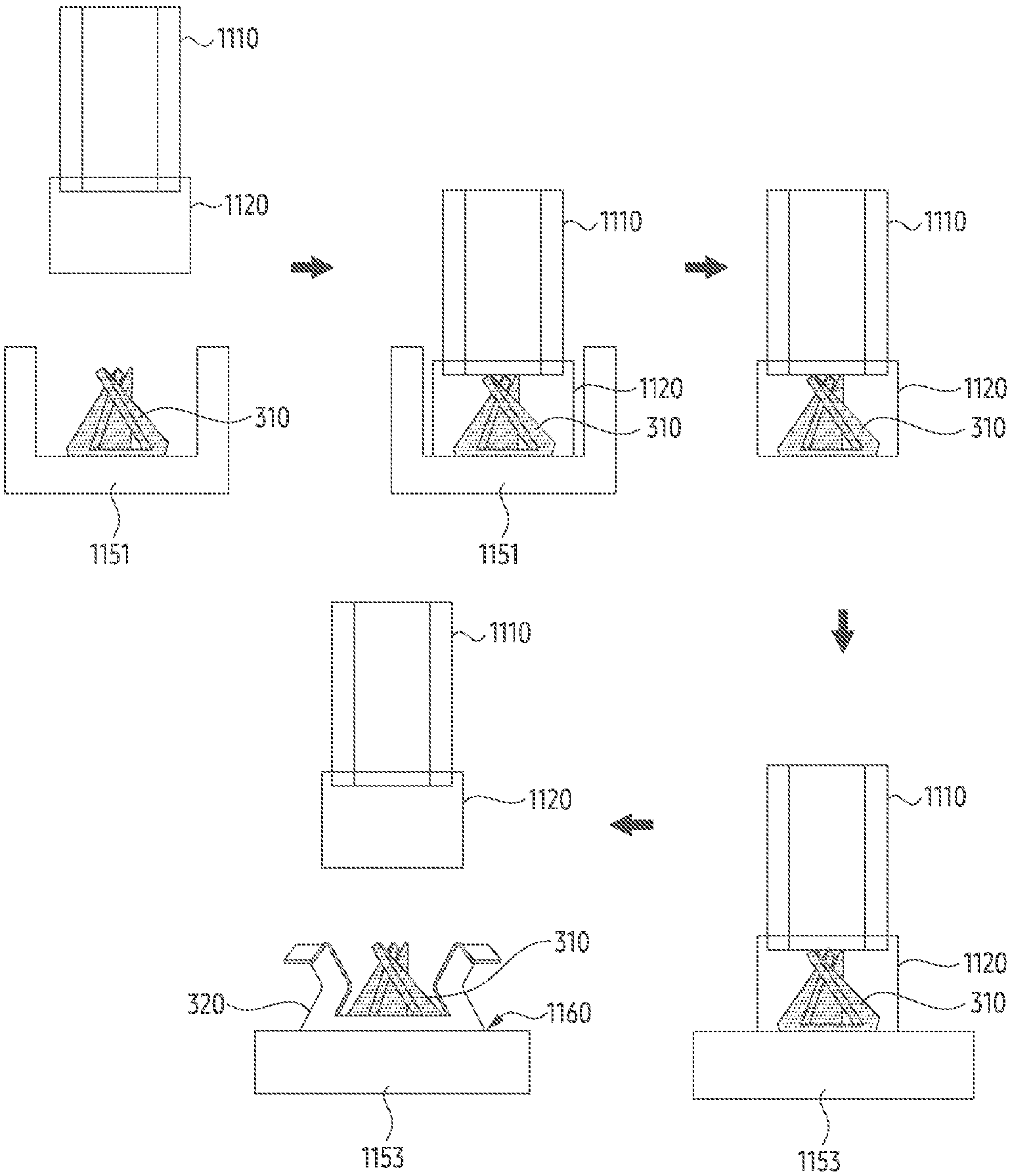

FIGS. 11A to 11B illustrate an example of picking-up a signal structure according to an embodiment. In order to describe the shape for the pick-up procedure, the signal structure 310 will be described as an example in FIGS. 11A and 11B.

Referring to FIG. 11A, the signal structure 310 may include a plurality of contact portions 401. The plurality of contact portions 401 may include a first contact portion 401*a*, a second contact portion 401*b*, and a third contact portion 401*c*. The plurality of contact portions 401 may be connected at regular intervals along the boundary of the substrate portion 403.

The pick-up tool may include a pick-up support 1110 and a suction portion 1120. The pick-up support 1010 is configured to fix the signal structure 310. The signal structure 310 may be positioned in the suction portion 1120, and the signal structure 310 may be coupled to the pick-up tool through suction from the side. The pick-up support 1110 may include a surface parallel to the surface of the substrate portion 403 of the signal structure 310 so that the signal structure 310 is not twisted by the suction. As the pick-up tool moves, the signal structure 500 may move.

Referring to FIG. 11B, the signal structure 310 may be disposed in the packaging member 1151. For example, the signal structure 310 may be packed through reel packaging. The pick-up tool may be inserted into one area of the packaging member 1151. The signal structure 310 may be connected to the pick-up tool through the pick-up support 1110. Due to the elastic characteristics of the first contact portion 401*a*, the second contact portion 401*b*, and the third contact portion 401*c* of the signal structure 310, one surface of the pick-up support 1110 may be in contact with each of the first contact portion 401*a*, the second contact portion 401*b*, and the third contact portion 401*c*. With the contact, shaking of the signal structure 310 may be reduced. Air in the inner space of the suction portion 1120 of the pick-up tool may be sucked through the pick-up tool.

Due to the movement of the pick-up tool, the signal structure 310 may also move together. The pick-up tool may move over one surface of the substrate 1153 on which the signal structure 310 is to be disposed. As the pick-up tool moves close to the one surface of the substrate 1153, the signal structure 310 may get close to the one surface of the substrate 1153. The pick-up tool may move until the substrate portion 403 of the signal structure 310 come into contact with the one surface of the substrate 1153. When the substrate portion 403 of the signal structure 310 is disposed on the one surface of the substrate 1153, the pick-up tool may be removed. The signal structure 310 may be disposed in an area formed in the connection portion of the ground structure 320. According to an embodiment, the signal structure 310 may be coupled to the substrate 1153 using the SMT process 1160. For example, the substrate 1153 may include a PCB on which RF components such as an antenna substrate or a filter for antenna elements are arranged.

Figure 12A:
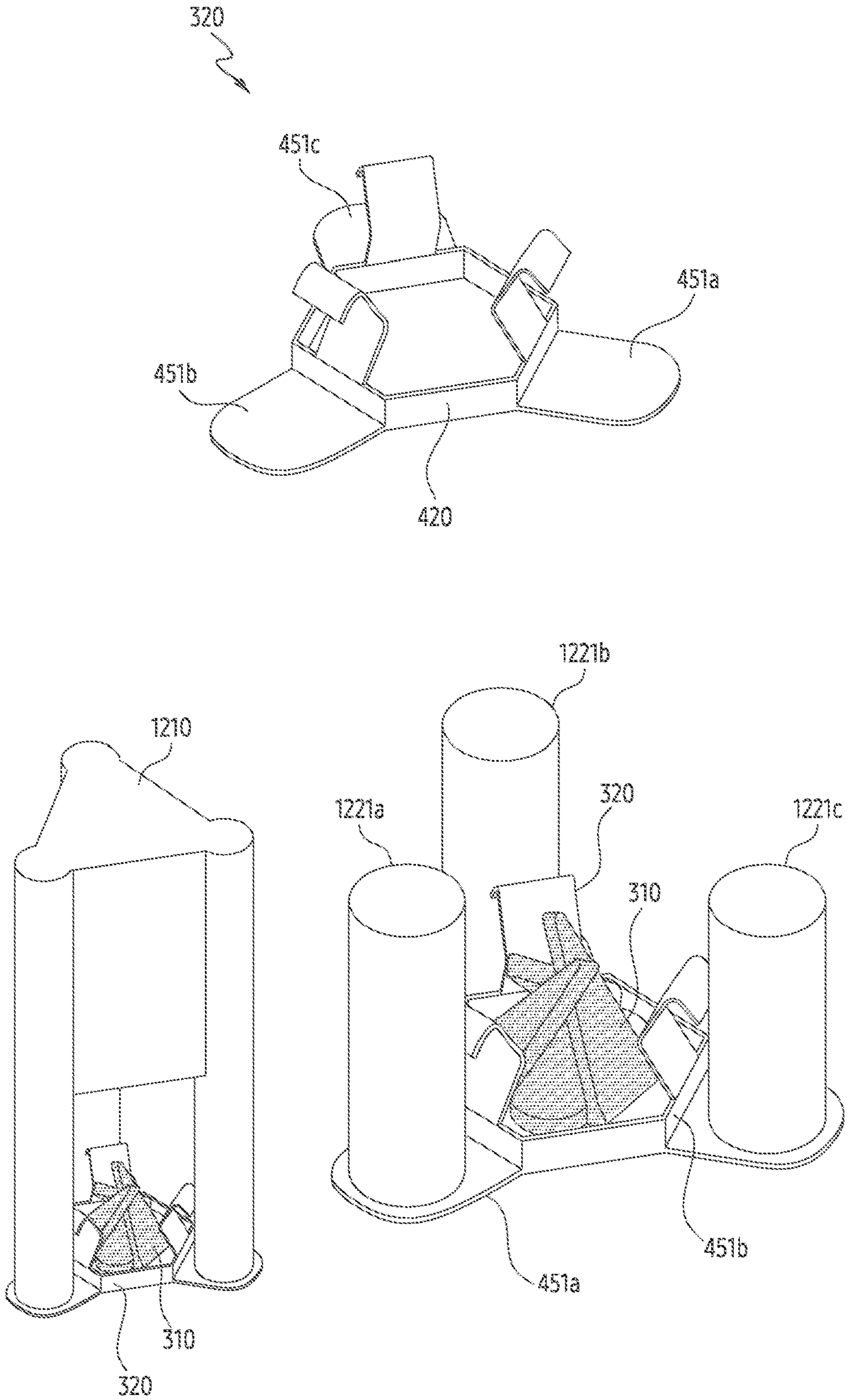
FIGS. 12A and 12B each illustrate an example of picking-up a ground structure according to an embodiment.
Figure 12B:
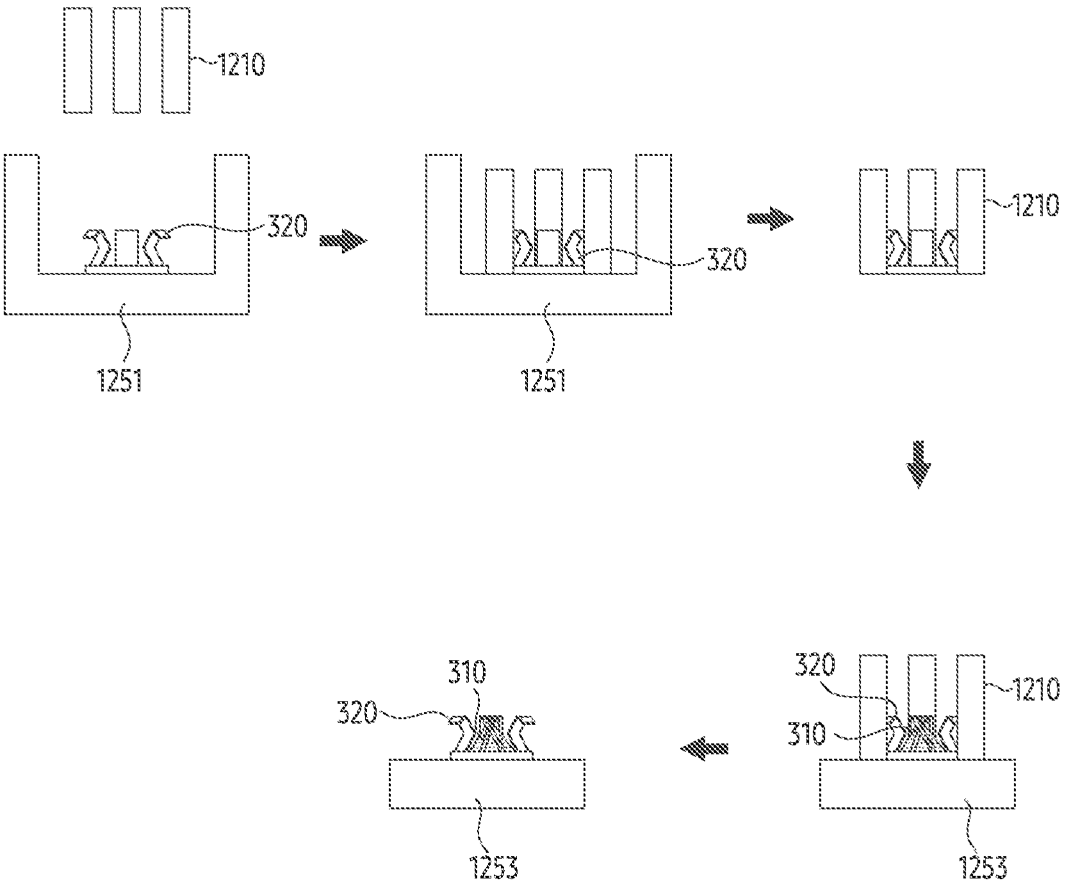

FIGS. 12A to 12B illustrate an example of picking-up a ground structure according to an embodiment. To describe the shape for the pick-up procedure, the ground structure 320 will be described as an example in FIGS. 12A and 12B.

Referring to FIG. 12A, the ground structure 320 may include a connection portion 420, a plurality of protrusion portions 441, and a plurality of support portions 451. The opening of the connection portion 420 of the ground structure 320 may form the spatial area 430.

The plurality of support portions 441 may include a first support portion 451*a*, a second support portion 451*b*, and a third support portion 451*c*. According to an embodiment, each support portion 451 may be stably disposed on one surface of a PCB (e.g., an antenna substrate or a filter PCB) and may have a shape of substrate for easy pick-up.

The pick-up tool may include a pick-up support 1210 and coupling structures (e.g., a coupling structure 1221*a*, a coupling structure 1221*b*, and a coupling structure 1221*c*). The pick-up support 1210 may be coupled to each of the coupling structures (e.g., the coupling structure 1221*a*, the coupling structure 1221*b*, and the coupling structure 1221*c*). The coupling structure may be coupled to the support portion of the ground structure 320 in order to stably move the ground structure 320. According to an embodiment, each coupling structure may have a columnar shape. Air may be sucked through the space within the coupling structure. Through suction, the support portion connected to the coupling structure may be connected to the coupling structure. As pressure is applied toward one surface of the support portion, the support portion may come into close contact with the coupling structure. For example, the coupling structure 1221*a* may be connected to the first support portion 451*a*. The coupling structure 1221*b* may be connected to the second support portion 451*b*. The coupling structure 1221*c* may be connected to the third support portion 451*c*.

Referring to FIG. 12B, the ground structure 320 may be disposed in the packaging member 1251. For example, the ground structure 320 may be packed with reel packaging. The pick-up tool may be inserted into one area of the packaging member 1251. The ground structure 320 may be connected to the pick-up tool through the coupling structure 1210. The coupling structure 1210 may come into contact with the ground structure 320 through the flat surfaces of the first support portion 451*a*, the second support portion 451*b*, and the third support portion 451*c* of the ground structure 320. Through air suction inside each pillar of the coupling structure 1210, the ground structure 320 may stably come into close contact with the pick-up tool. Due to the movement of the pick-up tool, the ground structure 320 may also move together. The pick-up tool may move over one surface of the substrate 1253 on which the ground structure 320 is to be disposed. As the pick-up tool moves close to one surface of the substrate 1253, the ground structure 320 may get close to the one surface of the substrate 1253. The pick-up tool may move until each support portion of the ground structure 320 come into contact with the one surface of the substrate 1253. When each support portion of the ground structure 320 is disposed on the one surface of the substrate 1253, the pick-up tool may be removed. According to an embodiment, the ground structure 320 may be coupled to the substrate 1253 through the SMT process 1160. For example, the substrate 1253 may include a PCB on which RF components such as an antenna substrate or a filter for antenna elements are arranged.

According to embodiments, an electronic device may include a first radio frequency (RF) component, a second RF component, a ground structure having first elasticity, and a signal structure having second elasticity. The signal structure may electrically connect the first RF component and the second RF component. The ground structure may include a connection portion including an opening and a plurality of protrusion portions. The signal structure may include a substrate portion to be disposed on one surface and a plurality of contact portions for electrical connection. The substrate portion or the plurality of contact portions of the signal structure may be disposed in a space formed based on the opening of the connection portion.

According to an embodiment, the ground structure may further include a plurality of support portions connected to the connection portion.

According to an embodiment, the ground structure may further include a plurality of support portions arranged along an edge area of the connection portion. Each of the plurality of support portions may have a plate shape for surface contact.

According to an embodiment, the plurality of contact portions of the signal structure may be in contact with a first surface of the first RF component. The substrate portion of the signal structure may be disposed on a first surface of the second RF component. An antenna may be disposed on a second surface opposite to the first surface of the first RF component. The first surface of the second RF component may be disposed to face the first surface of the first RF component.

According to an embodiment, the plurality of protrusion portions of the ground structure may be in contact with the first surface of the first RF component. The plurality of support portions of the ground structure may be disposed on the first surface of the second RF component.

According to an embodiment, the substrate portion of the signal structure may be in contact with the first surface of the first RF component. The plurality of contact portions of the signal structure may be disposed on the first surface of the second RF component. The antenna may be disposed on a second surface opposite to the first surface of the first RF component. The first surface of the second RF component may be disposed to face the first surface of the first RF component.

According to an embodiment, the plurality of protrusion portions of the ground structure may be in contact with the first surface of the first RF component. The plurality of support portions of the ground structure may be disposed on the first surface of the second RF component.

According to an embodiment, the plurality of contact portions of the signal structure may be disposed to have a flexible height from a substrate portion of the signal structure, based on a pressure in a direction perpendicular to the first RF component.

According to an embodiment, each of the plurality of protrusion portions of the ground structure may be disposed along a boundary line of the connection portion between the first RF component and the second RF component.

According to an embodiment, the connection portion of the ground structure and the plurality of protrusion portions of the ground structure may be integrally formed. The substrate portion of the signal structure and the plurality of contact portions of the signal structure may be integrally formed.

According to an embodiment, the plurality of contact portions of the signal structure may include a first contact portion and a second contact portion. One end of the first contact portion may be connected to the substrate portion, and the other end of the first contact portion may be disposed in a space corresponding to the substrate portion in between the first RF component and the second RF component. One end of the second contact portion may be connected to the substrate portion, and the other end of the second contact portion may be disposed in a space corresponding to the substrate portion in between the first RF component and the second RF component. When a pressure less than a threshold value is applied in a direction toward one side the substrate portion, the other end of the first contact portion and the other end of the second contact portion may be in contact with each other. When a pressure being greater than or equal to the threshold is applied in a direction toward one side of the substrate portion, the other end of the first contact portion and the other end of the second contact portion may be physically spaced apart from each other.

According to an embodiment, the first RF component may include a first printed circuit board (PCB) for an antenna. The second RF component may include a second PCB for an RF filter. A first surface of the second RF component may be disposed to face a first surface of the first RF component. The antenna may be disposed on a second surface opposite to the first surface of the first RF component. The RF filter may be disposed on a second surface opposite to the first surface of the second RF component.

According to an embodiment, the plurality of contact portions of the signal structure are configured to contact a feeding portion of the first RF component. The substrate portion of the signal structure is disposed on a second interior surface of the second RF component. An antenna is disposed on a first exterior surface of the first RF component opposite to a first interior surface of the first RF component. The second interior surface of the second RF component is disposed to face the first interior surface of the first RF component.

According to an embodiment, the plurality of protrusion portions of the ground structure are configured to contact a ground substrate of the second RF component. A plurality of support portions of the ground structure are disposed on the first interior surface of the first RF component.

According to an embodiment, the substrate portion of the signal structure is in contact with a first interior surface of the first RF component. The plurality of contact portions of the signal structure are configured to contact a feeding portion of the second RF component. An antenna is disposed on a first exterior surface of the first RF component opposite to the first interior surface of the first RF component. A second interior surface of the second RF component is disposed to face the first interior surface of the first RF component.

According to an embodiment, the plurality of protrusion portions of the ground structure are configured to contact a ground substrate of the second RF component. A plurality of support portions of the ground structure are disposed on the first interior surface of the first RF component.

According to an embodiment, the first RF component comprises a first printed circuit board (PCB) for an antenna. The second RF component comprises a second PCB for an RF filter. A second interior surface of the second RF component is disposed to face a first interior surface of the first RF component. The antenna is disposed on a first exterior surface of the first RF component opposite to the first interior surface of the first RF component. The RF filter is disposed on a second exterior surface opposite to the second interior surface of the second RF component.

According to embodiments, an electronic device may include a first RF component, a second RF component, and a plurality of connection assemblies disposed between the first RF component and the second RF component, for a plurality of antennas. The plurality of connection assemblies may include a ground structure having first elasticity and a signal structure having second elasticity, for each connection assembly. The signal structure may electrically connect the first RF component and the second RF component. The ground structure may include a connection portion including an opening and a plurality of protrusion portions. The signal structure may include a substrate portion to be disposed on one surface and a plurality of contact portions for electrical connection. The substrate portion or the plurality of contact portions of the signal structure may be disposed in a space formed based on the opening of the connection portion.

According to an embodiment, the second RF component may further include a ground board for connecting connection portions of each of the plurality of connection assemblies.

According to an embodiment, the second RF component may further include a ground board for a mounting of each of the plurality of connection assemblies, for the connection portion and the plurality of protrusion portions.

According to an embodiment, the second RF component may further include a ground board for an opening of each of the plurality of connection assemblies, for the connection portion and the plurality of protrusion portions.

According to an embodiment, the plurality of contact portions of the signal structure may be in contact with a first surface of the first RF component. The substrate portion of the signal structure may be disposed on a first surface of the second RF component. The antenna may be disposed on a second surface opposite to the first surface of the first RF component. The first surface of the second RF component may be disposed to face the first surface of the first RF component.

According to an embodiment, the plurality of protrusion portions of the ground structure may be in contact with the first surface of the first RF component. The connection portion of the ground structure may be disposed on the first surface of the second RF component.

According to an embodiment, the substrate portion of the signal structure may be in contact with the first surface of the first RF component. The plurality of contact portions of the signal structure may be disposed on the first surface of the second RF component. The antenna may be disposed on the second surface opposite to the first surface of the first RF component. The first surface of the second RF component may be disposed to face the first surface of the first RF component.

According to an embodiment, the plurality of protrusion portions of the ground structure may be in contact with the first surface of the first RF component. The connection portion of the ground structure may be disposed on the first surface of the second RF component.

According to an embodiment, the plurality of contact portions of the signal structure may be disposed to have a flexible height from a substrate portion of the signal structure, based on a pressure in a direction perpendicular to the first RF component.

According to an embodiment, each of the plurality of protrusion portions of the ground structure may be disposed along a boundary line of the connection portion in between the first RF component and the second RF component.

According to an embodiment, the plurality of connection assemblies may include a plurality of signal structures and a plurality of ground structures. The plurality of ground structures may be formed on one ground substrate. The opening and the plurality of protrusion portions of each of the plurality of ground structures may be integrally formed with the one ground substrate. The substrate portion and the plurality of contact portions of each of the plurality of signal structures may be integrally formed.

According to an embodiment, the plurality of contact portions of the signal structure may include a first contact portion and a second contact portion. One end of the first contact portion may be connected to the substrate portion, and the other end of the first contact portion may be disposed in a space corresponding to the substrate portion in between the first RF component and the second RF component. One end of the second contact portion may be connected to the substrate portion, and the other end of the second contact portion may be disposed in a space corresponding to the substrate portion in between the first RF component and the second RF component. When a pressure less than a threshold value is applied in a direction facing one surface of the substrate portion, the other end of the first contact portion and the other end of the second contact portion may be in contact with each other. When a pressure greater than or equal to the threshold value is applied in a direction facing one surface of the substrate portion, the other end of the first contact portion and the other end of the second contact portion may be physically spaced apart from each other.

According to an embodiment, the first RF component may include a first printed circuit board (PCB) for an antenna. The second RF component may include a second PCB for an RF filter. A first surface of the second RF component may be disposed to face a first surface of the first RF component. The antenna may be disposed on a second surface opposite to the first surface of the first RF component. The RF filter may be disposed on a second surface opposite to the first surface of the second RF component.

According to an embodiment, the plurality of contact portions of the signal structure are configured to contact a feeding portion of the first RF component. The substrate portion of the signal structure is disposed on a second interior surface of the second RF component. An antenna is disposed on a first exterior surface of the first RF component opposite to a first interior surface of the first RF component. The second interior surface of the second RF component is disposed to face the first interior surface of the first RF component.

According to an embodiment, the plurality of protrusion portions of the ground structure are configured to contact a ground substrate of the second RF component. A plurality of support portions of the ground structure are disposed on the first interior surface of the first RF component.

According to an embodiment, the substrate portion of the signal structure is in contact with a first interior surface of the first RF component. The plurality of contact portions of the signal structure are configured to contact a feeding portion of the second RF component. An antenna is disposed on a first exterior surface of the first RF component opposite to the first interior surface of the first RF component. A second interior surface of the second RF component is disposed to face the first interior surface of the first RF component.

According to an embodiment, the plurality of protrusion portions of the ground structure are configured to contact a ground substrate of the second RF component. A plurality of support portions of the ground structure are disposed on the first interior surface of the first RF component.

According to an embodiment, the first RF component comprises a first printed circuit board (PCB) for an antenna. The second RF component comprises a second PCB for an RF filter. A second interior surface of the second RF component is disposed to face a first interior surface of the first RF component. The antenna is disposed on a first exterior surface of the first RF component opposite to the first interior surface of the first RF component. The RF filter is disposed on a second exterior surface of the second RF component opposite to the second interior surface of the second RF component.

Figure 13:
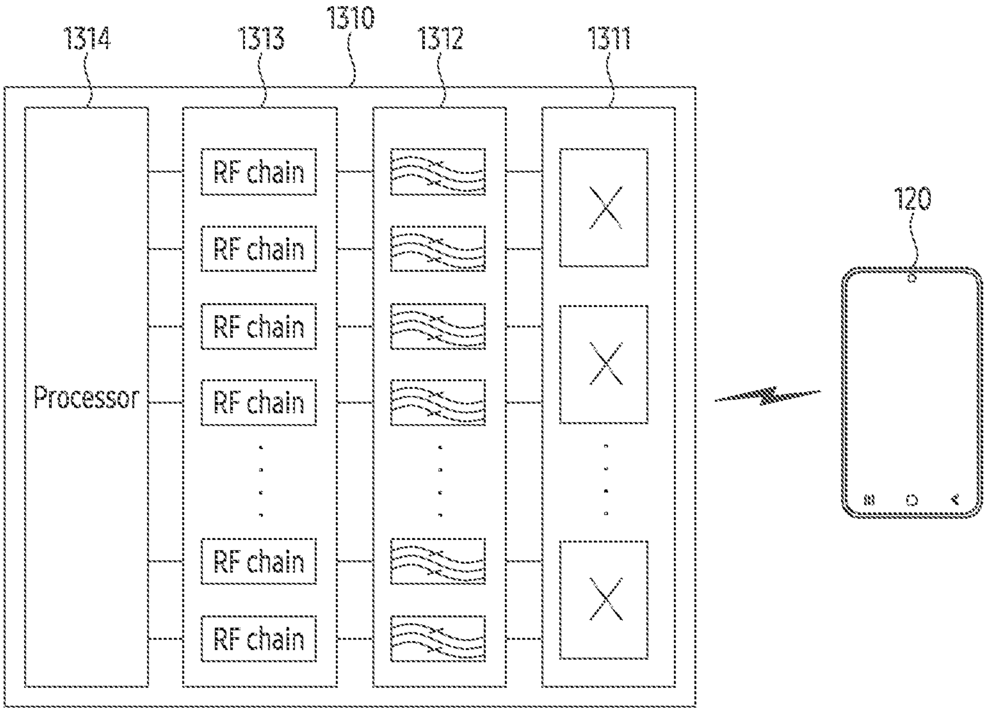
FIG. 13 illustrates an example of components of an electronic device according to an embodiment.

FIG. 13 illustrates an example of components of an electronic device according to an embodiment. FIG. 13 illustrates an example of a functional configuration of an electronic device 1310 including a connection assembly according to embodiments. The electronic device 1310 may be a base station 110 of FIG. 1 or an MMU of the base station 110. Meanwhile, as opposed to the illustrated, it is not excluded that the electronic device 1310 of the disclosure may be implemented in the terminal 120 of FIG. 1. The embodiments of the disclosure may include not only the structure of arrangement of the connection assembly described with reference to FIGS. 2A to 12B, but also an electronic device including the same.

Referring to FIG. 13, an example of the functional configuration of the electronic device 1310 is illustrated. The electronic device 1310 may include an antenna unit 1311, a filter unit 1312, a radio frequency (RF) processor 1313, and a controller 1314.

The antenna unit 1311 may include a plurality of antennas. The antenna performs functions for transmitting and receiving signals through a wireless channel. The antenna may include a radiator including a conductor or a conductive pattern formed on a substrate (e.g., a PCB). The antenna may radiate an up-converted signal over a wireless channel or obtain a signal radiated by another device. Each antenna may be referred to as an antenna element or an antenna component. In some embodiments, the antenna unit 1311 may include an antenna array in which a plurality of antenna elements form an array. The antenna unit 1311 may be electrically connected to the filter unit 1312 through RF signal lines. The antenna unit 1311 may be mounted on a PCB including a plurality of antenna elements. The PCB may include a plurality of RF signal lines connecting each antenna element and a filter of the filter unit 1312. These RF signal lines may be referred to as a feeding network.

According to an embodiment, the connection assembly may be disposed to make stable electrical connection between the antenna unit 1311 and the filter unit 1312. As a signal line, the connection assembly may include an elastic member for transmitting an RF signal and an elastic member for grounding of the RF signal. The antenna unit 1311 may provide the received signal to the filter unit 1312 or may radiate the signal provided from the filter unit 1312 into the air. As described with reference to FIGS. 1 to 12B, the elastic member for transmitting an RF signal may be of a signal structure, and the elastic member for grounding may be of a ground structure.

The filter unit 1312 may perform filtering to transmit a desired frequency of signal. The filter unit 1312 may perform a function for selectively identifying a frequency by forming resonance. The filter unit 1312 may include at least one of a band-pass filter, a low-pass filter, a high-pass filter, or a band-reject filter. That is, the filter unit 1312 may include RF circuits for obtaining a signal in a frequency band for transmission or a frequency band for reception. The filter unit 1312 according to an embodiment may electrically connect the antenna unit 1311 and the RF processor 1313.

The RF processor 1313 may include a plurality of RF paths. The RF path may be a unit of a path through which a signal received through an antenna or a signal radiated through an antenna passes. At least one RF path may be referred to as an RF chain. The RF chain may include a plurality of RF elements. The RF elements may include an amplifier, a mixer, an oscillator, a DAC, an ADC, and the like. For example, the RF processor 1313 may include an up-converter for up-converting a baseband of digital transmission signal into a transmission frequency, and a digital-to-analog converter (DAC) for converting the up-converted digital transmission signal into an analog RF transmission signal. The up converter and the DAC form part of a transmission path. The transmission path may further include a power amplifier (PA) or a coupler (or combiner). Further, for example, the RF processor 1313 may include an analog-to-digital converter (ADC) for converting an analog RF reception signal into a digital reception signal and a down-converter for down-converting the digital reception signal into a baseband of digital reception signal. The ADC and the down-converter form part of a reception path. The reception path may further include a low-noise amplifier (LNA) or a coupler (or a divider). The RF components of the RF processor may be implemented on the PCB. The base station 1310 may include a structure stacked in the order of the antenna unit 1311, the filter unit 1312, and the RF processor 1313. The antennas and the RF components of the RF processor may be implemented on the PCB, and the filters may be repeatedly fastened in between the PCBs to form a plurality of layers.

The controller 1314 may control overall operations of the electronic device 1310. The controller 1314 may include various modules for performing communication. The controller 1314 may include at least one processor such as a modem. The controller 1314 may include modules for digital signal processing. For example, the controller 1314 may include a modem. In data transmission, the controller 1314 may encode and modulate a transmission bit string to generate complex symbols. Further, for example, in data reception, the controller 1314 may demodulate and decode the baseband signal to restore the reception bit string. The controller 1314 may perform functions of a protocol stack demanded by the communication standard.

Heretofore, referring to FIG. 13, description has been made of the functional configuration of the electronic device 1310 as an apparatus capable of utilizing the antenna structure of the disclosure. However, the example illustrated in FIG. 13 merely shows an exemplary configuration for utilizing the antenna structure according to various embodiments of the disclosure described with reference to FIGS. 1 to 12B, and the embodiments of the disclosure are not limited to the components of the equipment illustrated in FIG. 13. Therefore, an antenna module including a specific antenna structure, a communication equipment of other configuration, and an antenna structure itself may be understood as embodiments of the disclosure.

A connection structure using an elastic member and an electronic device including the connection structure according to embodiments of the disclosure can provide a plurality of contact points to a substrate connection portion, through a ground structure with a plurality of protrusion areas and a signal structure with a plurality of protrusion areas, thereby providing stable connection performance.

The signal structure and the ground structure according to the disclosure do not require a separate mechanism (e.g., a connector) for connecting the filter PCB and the calibration network PCB to the antenna (or an antenna PCB) is not required, therefore reducing the manufacturing costs and simplifying the manufacturing process. Coupling at least one of the signal structure or the ground structure with the ground enables the number of components of the electronic device to be reduced, and achieving more efficient implementation of the electronic device.

The effects that can be obtained from the disclosure are not limited to those described above, and any other effects not mentioned herein will be clearly understood by those having ordinary knowledge in the art to which the disclosure belongs from the following description.

The methods according to various embodiments described in the claims and/or the specification of the disclosure may be implemented in the form of hardware, software, or a combination of hardware and software.

When implemented by software, a computer-readable storage medium storing one or more programs (software modules) may be provided. One or more programs stored in such a computer-readable storage medium are configured for execution by one or more processors in an electronic device. The one or more programs include instructions that cause the electronic device to execute the methods according to embodiments described in the claims or specification of the disclosure.

Such a program (e.g., software module, software) may be stored in a random-access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), other types of optical storage devices, or magnetic cassettes. Alternatively, it may be stored in a memory configured with a combination of some or all of the above. In addition, respective constituent memories may be provided in a multiple number.

Further, the program may be stored in an attachable storage device that can be accessed via a communication network such as e.g., Internet, Intranet, local area network (LAN), wide area network (WAN), or storage area network (SAN), or a communication network configured with a combination thereof. Such a storage device may be accessed to an apparatus performing an embodiment of the disclosure through an external port. Further, a separate storage device on the communication network may be accessed to an apparatus performing an embodiment of the disclosure.

In the above-described specific embodiments of the disclosure, a component included therein may be expressed in either a singular or a plural form according to a proposed specific embodiment. However, such a singular or plural expression may be selected appropriately for the presented context for the convenience of description, and the disclosure is not limited to the singular or the plural component. Therefore, an element expressed in the plural form may be formed of a singular element, or an element expressed in the singular form may be formed of plural elements.

Meanwhile, specific embodiments have been described in the detailed description of the disclosure, but it will be apparent that various modifications are possible without departing from the scope of the disclosure.

The invention claimed is:

1. An electronic device comprising:

a first radio frequency (RF) component;

a second RF component;

a ground structure having a first elasticity; and a signal structure having a second elasticity, wherein the signal structure electrically connects the first RF component and the second RF component, wherein the ground structure comprises a plurality of protrusion portions and a connection portion including an opening, wherein the signal structure comprises a substrate portion and a plurality of contact portions for electric connection, and wherein the substrate portion of the signal structure and the plurality of contact portions of the signal structure are disposed in a space formed based on the opening of the connection portion of the ground structure.

2. The electronic device of claim 1, wherein the ground structure further comprises a plurality of support portions arranged along an edge region of the connection portion of the ground structure, and wherein each of the plurality of support portions of the ground structure has a plate shape.

3. The electronic device of claim 2, wherein the plurality of contact portions of the signal structure are in contact with a first side of the first RF component, wherein the substrate portion of the signal structure is disposed on a first side of the second RF component, wherein an antenna is disposed on a second side of the first RF component opposite to the first side of the first RF component, and wherein the first side of the second RF component is disposed to face the first side of the first RF component.

4. The electronic device of claim 3, wherein the plurality of protrusion portions of the ground structure are in contact with the first side of the first RF component, and wherein the plurality of support portions of the ground structure are disposed on the first side of the second RF component.

5. The electronic device of claim 1, wherein the substrate portion of the signal structure is in contact with a first side of the first RF component, wherein the plurality of contact portions of the signal structure are disposed on a first side of the second RF component, wherein an antenna is disposed on a second side of the first RF component opposite to the first side of the first RF component, and wherein the first side of the second RF component is disposed to face the first side of the first RF component.

6. The electronic device of claim 5, wherein the plurality of protrusion portions of the ground structure are in contact with the first side of the first RF component, and wherein the plurality of support portions of the ground structure are disposed on the first side of the second RF component.

7. The electronic device of claim 1, wherein the plurality of contact portions of the signal structure are disposed to have a flexible height from the substrate portion of the signal structure based on a pressure in a direction perpendicular to the first RF component.

8. The electronic device of claim 1, wherein the connection portion of the ground structure and the plurality of protrusion portions of the ground structure are integrally formed, and wherein the substrate portion of the signal structure and the plurality of contact portions of the signal structure are integrally formed.

9. The electronic device of claim 1, wherein the plurality of contact portions of the signal structure include a first contact portion and a second contact portion, wherein a first one end of the first contact portion of the signal structure is connected to the substrate portion of the signal structure, and a first another end of the first contact portion of the signal structure is disposed in a first space corresponding to the substrate portion of the signal structure between the first RF component and the second RF component, wherein a second one end of the second contact portion of the signal structure is connected to the substrate portion of the signal structure, and a second another end of the second contact portion of the signal structure is disposed in a second space corresponding to the substrate portion of the signal structure between the first RF component and the second RF component, wherein, based on a first pressure, being less than a threshold, provided in a direction toward one side of the substrate portion of the signal structure, the first another end of the first contact portion of the signal structure and the second another end of the second contact portion of the signal structure are in contact with each other, and wherein, based on a second pressure, being greater than or equal to the threshold, provided in the direction toward one side of the substrate portion of the signal structure, the first another end of the first contact portion of the signal structure and the second another end of the second contact portion of the signal structure are physically spaced apart from each other.

10. The electronic device of claim 1, wherein the first RF component comprises a first printed circuit board (PCB) for an antenna, wherein the second RF component comprises a second PCB for an RF filter, wherein a first side of the second RF component is disposed to face a first side of the first RF component, wherein the antenna is disposed on a second side of the first RF component opposite to the first side of the first RF component, and wherein the RF filter is disposed on a second side of the second RF component opposite to the first side of the second RF component.

11. An electronic device comprising:

a first radio frequency (RF) component;

a second RF component;

a plurality of connection assemblies disposed between the first RF component and the second RF component, wherein, each connection assembly of the plurality of connection assemblies comprises:

a ground structure having a first elasticity, and a signal structure having a second elasticity, wherein the signal structure electrically connects the first RF component and the second RF component, wherein the ground structure comprises a plurality of protrusion portions and a connection portion including an opening, wherein the signal structure comprises a substrate portion and a plurality of contact portions for electric connection, and wherein the substrate portion of the signal structure and the plurality of contact portions of the signal structure are disposed in a space formed based on the opening of the connection portion of the ground structure.

12. The electronic device of claim 11, wherein the second RF component further comprises, for the connection portion of the ground structure and the plurality of protrusion portions of the ground structure, a ground board for a mounting of each of the plurality of connection assemblies.

13. The electronic device of claim 11, wherein the plurality of contact portions of the signal structure are in contact with a first side of the first RF component, wherein the substrate portion of the signal structure is disposed in on a first side of the second RF component, wherein an antenna is disposed on a second side of the first RF component opposite to the first side of the first RF component, and wherein the first side of the second RF component is disposed to face the first side of the first RF component.

14. The electronic device of claim 13, wherein the ground structure further comprises a plurality of support portions arranged along an edge region of the connection portion of the ground structure, wherein the plurality of protrusion portions of the ground structure are in contact with the first side of the first RF component, and wherein the plurality of support portions of the ground structure are disposed on the first side of the second RF component.

15. The electronic device of claim 11, wherein the substrate portion of the signal structure is in contact with a first side of the first RF component, wherein the plurality of contact portions of the signal structure are disposed on a first side of the second RF component, wherein an antenna is disposed on a second side of the first RF component opposite to the first side of the first RF component, and wherein the first side of the second RF component is disposed to face the first side of the first RF component.

16. The electronic device of claim 15, wherein the ground structure further comprises a plurality of support portions arranged along an edge region of the connection portion of the ground structure, wherein the plurality of protrusion portions of the ground structure are in contact with the first side of the first RF component, and wherein the plurality of support portions of the ground structure are disposed on the first side of the second RF component.

17. The electronic device of claim 11, wherein the plurality of contact portions of the signal structure are disposed to have a flexible height from the substrate portion of the signal structure, based on a pressure in a direction perpendicular to the first RF component.

18. The electronic device of claim 11, wherein the plurality of connection assemblies includes a plurality of signal structures and a plurality of ground structures, wherein the plurality of ground structures are formed on one ground plate, wherein the opening and the plurality of protrusion portions of each of the plurality of ground structures are integrally formed with the one ground plate, and wherein the substrate portion of the signal structure and the plurality of contact portions of each of the plurality of signal structures are integrally formed.

19. The electronic device of claim 11, wherein the plurality of contact portions of the signal structure include a first contact portion and a second contact portion, wherein a first one end of the first contact portion is connected to the substrate portion of the signal structure, and a first another end of the first contact portion of the signal structure is disposed in a first space corresponding to the substrate portion of the signal structure between the first RF component and the second RF component, wherein a second one end of the second contact portion is connected to the substrate portion of the signal structure, and a second another end of the second contact portion of the signal structure is disposed in a second space corresponding to the substrate portion of the signal structure between the first RF component and the second RF component, wherein, based on a first pressure, being less than a threshold, provided in a direction toward one side of the substrate portion of the signal structure, the first another end of the first contact portion of the signal structure and the second another end of the second contact portion of the signal structure are in contact with each other, and wherein, based on a second pressure, being greater than or equal to the threshold, provided in the direction toward one side of the substrate portion of the signal structure, the first another end of the first contact portion of the signal structure and the second another end of the second contact portion of the signal structure are physically spaced apart from each other.

20. The electronic device of claim 11, wherein the first RF component comprises a first printed circuit board (PCB) for an antenna, wherein the second RF component comprises a second PCB for an RF filter, wherein a first side of the second RF component is disposed to face a first side of the first RF component, wherein the antenna is disposed on a second side of the first RF component opposite to the first side of the first RF component, and wherein the RF filter is disposed on a second side of the second RF component opposite to the first side of the second RF component.

* * * * *